United States Patent
Leger et al.

(10) Patent No.: US 10,686,199 B2
(45) Date of Patent: Jun. 16, 2020

(54) FUEL CELL FLOW CHANNELS AND FLOW FIELDS

(71) Applicant: POWERDISC DEVELOPMENT CORPORATION LTD., Chilliwack (CA)

(72) Inventors: David E. Leger, Chilliwack (CA); Greg J. Montie, Surrey (CA)

(73) Assignee: Loop Energy Inc., Vancouver, B.C. (CA)

( * ) Notice: Subject to any disclaimer, the term of this patent is extended or adjusted under 35 U.S.C. 154(b) by 0 days.

(21) Appl. No.: 14/622,830

(22) Filed: Feb. 14, 2015

(65) Prior Publication Data
US 2015/0180052 A1 Jun. 25, 2015

Related U.S. Application Data

(63) Continuation of application No. PCT/CA2013/050627, filed on Aug. 14, 2013.
(Continued)

(51) Int. Cl.
*H01M 8/02* (2016.01)
*H01M 8/026* (2016.01)
(Continued)

(52) U.S. Cl.
CPC ......... *H01M 8/026* (2013.01); *H01M 8/0265* (2013.01); *H01M 8/10* (2013.01);
(Continued)

(58) Field of Classification Search
CPC ...... H01M 8/026; H01M 8/0265; H01M 8/10; H01M 8/1011; H01M 2008/1095; Y02E 60/523
See application file for complete search history.

(56) References Cited

U.S. PATENT DOCUMENTS 4,324,844 A    4/1982   Kothmann
4,407,904 A   10/1983   Uozumi et al.
(Continued)

FOREIGN PATENT DOCUMENTS

AT       407589 B     8/2000
CA     2437892 A1     8/2002
(Continued)

OTHER PUBLICATIONS

Sammes, Nigel, ed. Fuel cell technology: reaching towards commercialization. Springer Science & Business Media, 2006. (Year: 2006).*
(Continued)

*Primary Examiner* — Victoria H Lynch
(74) *Attorney, Agent, or Firm* — Cook Alex, Ltd.; Ryan M. Truesdale

(57) ABSTRACT

A fuel cell anode flow field includes at least one flow channel with a cross-sectional area that varies along at least a portion of its length. In some embodiments, the channel width decreases along at least a portion of the channel length according to a natural exponential function. This type of anode flow field can improve performance, reduce fuel consumption and/or reduce detrimental effects such as carbon corrosion and catalyst degradation, thereby improving fuel cell longevity and durability. When operating the fuel cell on either a substantially pure or a dilute fuel stream, this type of anode flow field can provide more uniform current density. These flow channels can be incorporated into reactant flow field plates, fuel cells and fuel cell stacks.

9 Claims, 20 Drawing Sheets

Related U.S. Application Data

(60) Provisional application No. 61/683,156, filed on Aug. 14, 2012, provisional application No. 61/712,010, filed on Oct. 10, 2012, provisional application No. 61/712,236, filed on Oct. 10, 2012.

(51) Int. Cl.
| | |
|---|---|
| *H01M 8/1011* | (2016.01) |
| *H01M 8/0265* | (2016.01) |
| *H01M 8/10* | (2016.01) |
| H01M 8/1018 | (2016.01) |

(52) U.S. Cl.
CPC .. *H01M 8/1011* (2013.01); *H01M 2008/1095* (2013.01); *Y02E 60/523* (2013.01)

(56) References Cited

U.S. PATENT DOCUMENTS

| | | | |
|---|---|---|---|
| 4,490,445 A | 12/1984 | Hsu | |
| 4,770,955 A | 9/1988 | Ruhl | |
| 4,910,100 A | 3/1990 | Nakanishi | |
| 4,953,634 A | 9/1990 | Nelson et al. | |
| 5,338,622 A | 8/1994 | Hsu et al. | |
| 5,399,442 A | 3/1995 | Shundo | |
| 5,514,486 A | 5/1996 | Wilson | |
| 5,527,634 A | 6/1996 | Meacham | |
| 5,549,983 A | 8/1996 | Yamanis | |
| 5,589,285 A | 12/1996 | Cable | |
| 5,595,834 A | 1/1997 | Wilson et al. | |
| 5,851,689 A | 12/1998 | Chen | |
| 6,048,633 A | 4/2000 | Fujii et al. | |
| 6,161,610 A | 12/2000 | Azar | |
| 6,234,245 B1 | 5/2001 | Reid et al. | |
| 6,245,453 B1 | 6/2001 | Iwase et al. | |
| 6,253,835 B1 | 7/2001 | Chu et al. | |
| 6,258,474 B1 | 7/2001 | Diethelm et al. | |
| 6,291,089 B1 | 9/2001 | Piaschik et al. | |
| 6,337,794 B1 | 1/2002 | Agonafer et al. | |
| 6,344,290 B1 | 2/2002 | Bossell et al. | |
| 6,406,809 B1 | 6/2002 | Fujii et al. | |
| 6,423,437 B1 | 7/2002 | Kenyon | |
| 6,528,196 B1 | 3/2003 | Fujii et al. | |
| 6,551,736 B1 | 4/2003 | Gurau et al. | |
| 6,586,128 B1 | 7/2003 | Johnson et al. | |
| 6,663,992 B2 | 12/2003 | Lehnert et al. | |
| 6,664,693 B2 | 12/2003 | Leger et al. | |
| 6,686,082 B2 | 2/2004 | Leger et al. | |
| 6,699,614 B2 | 3/2004 | Rock | |
| 6,722,422 B1 | 4/2004 | Feldmeier | |
| 6,729,383 B1 | 5/2004 | Cannell et al. | |
| 6,756,149 B2 | 6/2004 | Knights et al. | |
| 6,773,843 B2 | 8/2004 | Kitagawa et al. | |
| 6,849,539 B2 | 2/2005 | Vora et al. | |
| 6,903,931 B2 | 6/2005 | McCordic et al. | |
| 6,921,598 B2 | 7/2005 | Yamamoto | |
| 7,008,712 B2 | 3/2006 | Naruse et al. | |
| 7,067,213 B2 | 6/2006 | Boff et al. | |
| 7,108,929 B2 | 9/2006 | Kutrz et al. | |
| 7,138,200 B1 | 11/2006 | Iwase et al. | |
| 7,316,853 B2 | 1/2008 | Takagi et al. | |
| 7,348,094 B2 | 3/2008 | Thompson et al. | |
| 7,399,547 B2 | 7/2008 | Perry | |
| 7,459,227 B2 | 12/2008 | Rock et al. | |
| 7,517,602 B2 | 4/2009 | Homma | |
| 7,524,575 B2 | 4/2009 | Bai et al. | |
| 7,593,230 B2 | 9/2009 | Abul-Haj et al. | |
| 7,601,452 B2 | 10/2009 | Goebel | |
| 7,615,308 B2 | 11/2009 | Frederiksen et al. | |
| 7,618,734 B2 | 11/2009 | Rapaport et al. | |
| 7,718,298 B2 | 5/2010 | Tighe et al. | |
| 7,781,087 B2 | 8/2010 | Rock et al. | |
| 7,838,139 B2 | 11/2010 | Turpin et al. | |
| 7,838,169 B2 | 11/2010 | Montie et al. | |
| 7,883,813 B2 | 2/2011 | Lyle et al. | |
| 8,026,013 B2 | 9/2011 | Valensa | |
| 8,026,020 B2 | 9/2011 | Spink et al. | |
| 8,157,527 B2 | 4/2012 | Piggush et al. | |
| 8,557,462 B2 | 10/2013 | An et al. | |
| 2001/0003302 A1 | 6/2001 | Azar | |
| 2001/0003309 A1 | 6/2001 | Aoyagi et al. | |
| 2002/0012463 A1 | 1/2002 | Yamada | |
| 2002/0017463 A1 | 2/2002 | Merida-Donis | |
| 2003/0059662 A1* | 3/2003 | Debe | H01M 8/026 429/514 |
| 2003/0077501 A1 | 4/2003 | Knights et al. | |
| 2004/0023100 A1 | 2/2004 | Boff et al. | |
| 2004/0067405 A1 | 4/2004 | Turpin et al. | |
| 2004/0099045 A1 | 5/2004 | Demarest et al. | |
| 2004/0142225 A1 | 7/2004 | Turpin et al. | |
| 2005/0081552 A1 | 4/2005 | Nilson et al. | |
| 2005/0112428 A1 | 5/2005 | Freeman et al. | |
| 2005/0115825 A1 | 6/2005 | Frank et al. | |
| 2005/0123821 A1 | 6/2005 | Al-Quattan et al. | |
| 2005/0142425 A1 | 6/2005 | Homma | |
| 2005/0221152 A1 | 10/2005 | Turpin et al. | |
| 2005/0271909 A1 | 12/2005 | Bai et al. | |
| 2006/0093891 A1* | 5/2006 | Issacci | H01M 8/0258 429/482 |
| 2006/0234107 A1 | 10/2006 | Leger et al. | |
| 2006/0257704 A1 | 11/2006 | Ogino et al. | |
| 2007/0009781 A1 | 1/2007 | Dong | |
| 2007/0099062 A1* | 5/2007 | Leonida | H01M 4/8605 429/422 |
| 2007/0105000 A1 | 5/2007 | Chapman et al. | |
| 2007/0178359 A1* | 8/2007 | Peng | H01M 8/0258 429/444 |
| 2007/0289718 A1 | 12/2007 | McCordic et al. | |
| 2008/0008916 A1 | 1/2008 | Shin et al. | |
| 2008/0066888 A1 | 3/2008 | Tong et al. | |
| 2008/0070080 A1 | 3/2008 | Miyazaki | |
| 2008/0096083 A1 | 4/2008 | Kuan et al. | |
| 2008/0107946 A1 | 5/2008 | Gunji et al. | |
| 2008/0213648 A1 | 9/2008 | Montie et al. | |
| 2008/0248367 A1 | 10/2008 | Chou et al. | |
| 2008/0248371 A1 | 10/2008 | Weng et al. | |
| 2008/0280177 A1 | 11/2008 | Ose et al. | |
| 2008/0311461 A1 | 12/2008 | Farrington et al. | |
| 2009/0035616 A1 | 2/2009 | Darling et al. | |
| 2009/0053570 A1 | 2/2009 | Tian et al. | |
| 2009/0081516 A1 | 3/2009 | Watanabe et al. | |
| 2009/0145581 A1 | 6/2009 | Hoffman et al. | |
| 2009/0208803 A1 | 8/2009 | Farrington | |
| 2010/0119909 A1 | 5/2010 | McElroy et al. | |
| 2010/0178581 A1 | 7/2010 | An et al. | |
| 2010/0190087 A1 | 7/2010 | Yoshida et al. | |
| 2010/0203399 A1 | 8/2010 | Poshusta et al. | |
| 2010/0216044 A1 | 8/2010 | Hawkins et al. | |
| 2010/0279189 A1 | 11/2010 | Wang et al. | |
| 2011/0076585 A1 | 3/2011 | Edmontson et al. | |
| 2011/0079370 A1 | 4/2011 | Wen et al. | |
| 2011/0097648 A1 | 4/2011 | Blank et al. | |
| 2011/0159396 A1 | 6/2011 | Kleemann et al. | |
| 2011/0171023 A1 | 7/2011 | Lee et al. | |
| 2011/0171551 A1 | 7/2011 | Burmeister et al. | |
| 2011/0177417 A1 | 7/2011 | Wolk et al. | |
| 2011/0223508 A1 | 9/2011 | Arnold | |
| 2011/0232885 A1 | 9/2011 | Kaslusky et al. | |
| 2011/0262826 A1 | 10/2011 | Dadheech et al. | |
| 2011/0269037 A1 | 11/2011 | Burmeister et al. | |
| 2012/0107714 A1 | 5/2012 | Day et al. | |
| 2012/0308911 A1 | 12/2012 | Peled et al. | |
| 2013/0149625 A1 | 6/2013 | Ikeya | |
| 2013/0252116 A1 | 9/2013 | Zhang et al. | |
| 2015/0180052 A1 | 6/2015 | Leger et al. | |
| 2015/0180079 A1 | 6/2015 | Leger et al. | |
| 2015/0349353 A1 | 12/2015 | Hood et al. | |
| 2019/0140289 A1 | 5/2019 | Leger et al. | |

FOREIGN PATENT DOCUMENTS

| | | |
|---|---|---|
| CA | 2441087 A1 | 10/2002 |
| CA | 2456731 A1 | 8/2004 |

(56) References Cited

FOREIGN PATENT DOCUMENTS

| | | | |
|---|---|---|---|
| CA | 2880560 A1 | 7/2006 | |
| CA | 2653148 A1 | 8/2009 | |
| CA | 2787467 A1 | 7/2011 | |
| CN | 1491446 A | 4/2004 | |
| CN | 1663067 A | 8/2005 | |
| CN | 101099253 A | 1/2008 | |
| CN | 102089911 A1 | 6/2011 | |
| DE | 10054444 A1 * | 5/2001 | ......... H01M 8/0202 |
| DE | 10054444 A1 | 10/2007 | |
| EP | 0207799 A2 | 1/1987 | |
| EP | 0355420 B1 | 10/1993 | |
| EP | 0694216 B1 | 1/1996 | |
| EP | 149655 A1 | 1/2005 | |
| EP | 1410455 B1 | 8/2006 | |
| EP | 1512192 B1 | 5/2008 | |
| EP | 2113731 A1 | 11/2009 | |
| JP | SHO61-61256568 | 11/1986 | |
| JP | HEI03-3276569 A | 12/1991 | |
| JP | HEI04-4370664 A | 12/1992 | |
| JP | HEI06-6267564 A | 9/1994 | |
| JP | HEI09-9050817 A | 2/1997 | |
| JP | HEI11-11016590 A | 1/1999 | |
| JP | HEI13-2001006717 A | 1/2001 | |
| JP | H245029813 B2 | 9/2012 | |
| JP | H2450269813 B2 | 9/2012 | |
| WO | 2002065566 A1 | 8/2002 | |
| WO | 2002089244 A1 | 11/2002 | |
| WO | 2006120027 A1 | 11/2006 | |
| WO | 2011028389 A2 | 3/2011 | |
| WO | 2014056110 A1 | 4/2014 | |

OTHER PUBLICATIONS

Marangio et al., "Theoretical model and experimental analysis of a high pressure PEM water electrolyser for hydrogen production", International Journal of Hydrogen Energy, 2009, pp. 1143-1158, vol. 34.
Remick, "Reversible Fuel Cells Workshop Summary Report", U.S. Department of Energy, 2011, pp. 1-150.
Hwang et al., "Flow Field Design for a Polymer Electrolyte Unitized Reversible Fuel Cell", Honolulu PRiME, 2012, Abstract#1405.
Bonghwan et al., "Dynamic Simulation of PEM Water Electrolysis and Comparison with Experiments", Int. J. Electrochem. Sci., 2013, pp. 235-248, vol. 8.
International Search Report and Written Opinion dated Sep. 24, 2013 in connection with International Application No. PCT/CA2013/050626.
International Search Report dated Nov. 13, 2013 in connection with International Application No. PCT/CA2013/050627.
International Search Report dated Nov. 15, 2013 in connection with International Application No. PCT/CA2013/050769.
International Preliminary Report dated Feb. 26, 2015 in connection with International Application No. PCT/CA2013/050627.
First Office Action dated Oct. 10, 2016 in connection with Chinese Patent Application No. 201380064598.4.
First Office Action dated Oct. 17, 2016 in connection with Chinese Patent Application No. 201380053699.1.
International Search Report and Written Opinion dated Jun. 15, 2017 in connection with International Application No. PCT/CA2017/050358.
Claiborne, H.C., "Heat Transfer in Non-Circular Ducts", Oak Ridge National Laboratory operated by Carbide and Carbon Chemicals Co., 1951, pp. 1-43.
Montgomery, S.R. et al., "Laminar Flow Heat Transfer for Simultaneously Developing Velocity and Temperature Profiles in Ducts of Rectangular Cross Section", Appl. Sci. Res., vol. 18, 1967, pp. 247-259.
Barrow, H. et al., "The Effect of Velocity Distribution on Forced Convection Laminar Flow Heat Transfer in a Pipe at Constant Wall Temperature", Warme and Stoffubertragung, Bd. 3, 1970, pp. 227-231.
Biber, C. R., "Pressure Drop and Heat Transfer in an Isothermal Channel with Impinging Flow", IEEE Transactions on Components, Packaging, and Manufacturing Technology Part A, vol. 20(4), 1997, pp. 458-462.
Soule, C. A., "Future Trends in Heat Sink Design", https://www.electronics-cooling.com/2001/02/future-trends-in-heat-sink-design/, 2001, accessed Dec. 6, 2018.
Banker, R., et al., "Experimental and Computational Investigation of the Hydrodynamics and Heat Transfer in a Flat Channel of Variable Width for Smooth and Intensified Surfaces", Heat Transfer Research, vol. 35, 2004, pp. 1-10.
Koz, M. et al., "A Preliminary Study for 3D Numerical Simulation of a Throughplane Temperature Profile in a PEMFC Incorporating Coolant Channels", Proceedings of the ASME 2012 10th International Conference on Nanochemicals, Microchannels, and Minichannels, ICNNM12, Jul. 8-12, 2012, Rio Grande, Puerto Rico, pp. 1-10.
Kuan, et al., "Heat-Transfer Analysis of a Water-Cooled Channel for the TPS Front-End Components", THPF1072, Proceedings of IPAC2013, Shanghai, China, 2013, pp. 3466-3468.
The Examination Report issued by the Canadian Intellectual Property Office dated Jun. 10, 2019 in connection with Canadian patent application No. 2,919,875.
The Examination Report issued by the Canadian Intellectual Property Office dated Aug. 6, 2019 in connection with Canadian patent application No. 2,925,051.
Office Action issued in connection with CA App. No. 2,919,875 dated Feb. 7, 2020.
Examination Report issued in connection with UK App. No. GB1503750.0 dated Feb. 24, 2020.
1st Office Action issued in connection with Chinese App. No. 201710699586.9 dated Feb. 25, 2020.
1st Office Action issued in connection with Chinese App. No. 201710699589.2 dated Mar. 3, 2020.
Examination Report issued in connection with UK App. No. GB1503751.8 dated Mar. 18, 2020.
1st Office Action issued in connection with Chinese App. No. 201711004994.4 dated Mar. 24, 2020.

* cited by examiner

FUEL CELL FLOW CHANNELS AND FLOW FIELDS

CROSS-REFERENCE TO RELATED APPLICATIONS

This application is a continuation of International Application No. PCT/CA2013/050627 having a filing date of Aug. 14, 2013 entitled "Fuel Cell Flow Channels and Flow Fields", which is related to and claim priority benefits from U.S. Provisional Patent Application Ser. No. 61/683,156 filed Aug. 14, 2012, entitled "Fuel Cell Components, Stacks and Systems Based on a Cylindrical Fuel Cell Stack Architecture", U.S. Provisional Patent Application Ser. No. 61/712,010 filed Oct. 10, 2012, entitled "Fuel Cell Anode Flow Field" and U.S. Provisional Patent Application Ser. No. 61/712,236 filed Oct. 10, 2012 entitled "Fuel Cell Flow Fields Incorporating Improved Flow Channels for Enhanced Performance". This application also claims priority benefits from the '156, '236, and '010 applications.

The PCT/CA2013/050627 international application, 61/683,156 provisional application, 61/712,010 provisional application, and 61/712,236 provisional application are each hereby incorporated by reference herein in their entireties.

FIELD OF THE INVENTION

This present invention relates generally to fuel cells, and in particular to flow field designs and flow field plates for fuel cells.

BACKGROUND OF THE INVENTION

In typical polymer electrolyte membrane (PEM) fuel cells, a membrane electrode assembly (MEA) is disposed between two electrically conductive separator plates. Oxidant and fuel flow fields provide means for directing the oxidant and fuel to respective electrocatalyst layers of the MEA, specifically, to an anode on the fuel side and to a cathode on the oxidant side of the MEA. A typical reactant fluid flow field has at least one channel through which a reactant stream flows. The fluid flow field is typically integrated with the separator plate by locating a plurality of open-faced channels on one or both faces of the separator plate. The open-faced channels face an electrode, where the reactants are electrochemically reacted. Typically more reactant is supplied to the electrodes than is actually consumed by the electrochemical reactions in the fuel cell. Stoichiometry (or stoichiometry ratio) can be defined as the molar flow rate of a reactant supplied to a fuel cell divided by the molar flow rate of reactant consumed in the fuel cell; reactant stoichiometry is the inverse of reactant utilization.

In a single cell arrangement, separator plates are provided on each of the anode and cathode sides. The plates act as current collectors and provide structural support for the electrodes. In a fuel cell stack, often bipolar plates, having reactant flow fields on both sides, are interleaved with MEAs.

In conventional fuel cell flow fields, the reactant flow channels have a constant cross-sectional area and shape along their length. Typically the channels are square or rectangular in cross-section. However, fuel cells where the cross-sectional area of flow channels varies along their length are known. For example, Applicant's issued U.S. Pat. No. 6,686,082 and U.S. Patent Application Publication No. US2006/0234107 (each of which is hereby incorporated by reference herein in its entirety) describe fuel cell flow field plates with a trapezoidal form, in which the flow channels are rectangular in cross-section and have a cross-sectional area that continuously diminishes in the flow direction. In particular, embodiments are described in which the flow channel width decreases linearly in the flow direction. Such tapered channels provide an increase in reactant velocity along the channel, and were intended to provide some of the advantages of serpentine flow channels without the significant pressure drop and the related increase in parasitic load usually associated with serpentine flow channels. Serpentine flow fields provide higher reactant velocity and improved water removal in the channels relative to conventional flow fields covering roughly the same flow field area.

It is also known that it is possible to enhance fuel cell performance by varying the cross-sectional area of cathode flow channels along their length. Fuel cells generally operate on a dilute oxidant stream, namely air, at the cathode. As the air flows along the cathode flow channel(s), the oxygen content in the air stream tends to be depleted and the air pressure tends to drop. This can result in reduced performance and uneven current density in the fuel cell. Applicant's issued U.S. Pat. No. 7,838,169 (which is incorporated herein by reference in its entirety) describes improved cathode flow field channels, with a more sophisticated variation in channel cross-section, which can be used to achieve substantially constant oxygen availability at the cathode. Embodiments are described in which the cross-sectional area of the channels varies along the length of the channels such that oxygen availability is kept substantially constant for a given channel length and air stoichiometry. In some embodiments the channel width decreases in the oxidant flow direction according to an exponential function. By maintaining substantially constant oxygen availability along the channel, use of such cathode flow channels has been shown to provide improved uniformity of current density and to enhance fuel cell performance.

There are a number of factors that can lead to irreversible performance losses and/or loss of electrochemical surface area during prolonged operation in PEM fuel cells. The losses are mainly the result of catalyst layer degradation including platinum metal dissolution and corrosion of carbon supports. Carbon corrosion can be caused by cell reversal which, in turn, can be a result of uneven reactant distribution and/or fuel starvation in regions of the anode. Platinum dissolution can be caused by high potentials at the cathode or anode which can occur when there is heterogeneous current distribution. Individually or coupled together, these degradation rates can be significant and require mitigation for long term stable operation. Operating a fuel cell with uniform current density can reduce carbon corrosion and platinum dissolution, both of which are detrimental to fuel cell performance, longevity and durability. It can be postulated that achieving more uniform current density will reduce fuel cell degradation rates and thereby improve fuel cell lifetime. Furthermore, increasing velocities down the channel can reduce the residence time of hydrogen/air fronts during air purge cycles at the anode during fuel cell start-stop sequences, leading to reduced carbon corrosion rates and improved durability.

The flow field channels described in the '169 patent were originally developed for and applied at the fuel cell cathode, and were not expected to provide particular benefits at the anode, at least in part because fuel cell operation on substantially pure hydrogen does not result in substantial mass transport losses due to high concentration and the high diffusivity of the hydrogen molecule. However, Applicants have now determined that such flow field channels can be modified for use at the anode to enhance fuel cell performance when the fuel cell is operating on a dilute fuel, and to provide performance benefits even when the fuel cell is operating on a substantially pure fuel.

Often a substantially pure fuel stream (such as hydrogen) is used at the fuel cell anode, and the issue of reactant depletion and reactant availability along the anode flow channels is not the same as with air at the cathode. Usually, for operation on a substantially pure fuel, the anode flow field is "dead-ended", and the fuel cell or fuel cell stack is fitted with a bleed- or purge-valve for removing impurities, contaminants and/or water that tends to accumulate in the downstream portion of the anode flow channels as fuel is consumed during operation of the fuel cell. This accumulation of "inerts" can result in uneven current density, resulting in reduced fuel cell performance. Furthermore, accumulation of water in the anode flow channels can cause other problems including blocking fuel access to the anode catalysts leading to a fuel starvation condition that has been linked to both carbon corrosion and noble metal catalyst dissolution. Applicants have determined that flow field channels similar to those described in the '169 patent can be modified for use at the anode to reduce some of these detrimental effects at the anode, and enhance fuel cell performance even on a substantially pure fuel. Such channels can provide an increase in the velocity of the fuel during its passage along the channel. It is believed that this can improve fuel utilization, as increasing the flow velocity on the anode can provide a higher fuel availability leading to a leveling of the current density at lower flow rates. This can reduce fuel consumption for a given power output. Furthermore, if the fuel cell is operating on a dilute fuel stream (such as a reformate stream which contains hydrogen, or aqueous methanol), as the fuel stream flows along the flow channels, the hydrogen content in the stream tends to be depleted and the fuel stream pressure tends to drop. Both of these can result in reduced fuel cell performance. The anode flow field channels described herein can be used to compensate for the depletion of fuel, achieving substantially constant fuel availability on a dilute fuel, and thereby providing more uniform current density.

In addition to their modification for use at the anode, further improvements and variations on the flow field channels and flow fields described in the '169 patent have been made and are described herein. In particular, embodiments in which such flow channels can be incorporated or retrofit into conventional rectangular fuel cell geometries at the anode and/or cathode (rather than trapezoidal fuel cells) with high utilization of the fuel cell active area and efficient use of MEA and plate materials are described. Embodiments are also described in which the characteristics of the channel vary as a function of distance along the channel in accordance with the same or similar principles as in the '169 patent and as described herein, but along only a portion of the channel length. Further embodiments are described in which the characteristics of the channel vary as a function of distance along the channel in accordance with the same or similar principles, but in a stepwise or discontinuous manner. Such embodiments can be used to achieve at least some of the performance benefits described above, and can also provide options for improved flow fields that are easier to fabricate or to incorporate into rectangular fuel cell plate geometries.

SUMMARY OF THE INVENTION

The above and other benefits are achieved by a fuel cell anode flow field plate comprising a fuel inlet, a fuel outlet, and at least one channel formed in a major surface of the plate, the at least one channel having a floor and a pair of side walls extending between the floor and the major surface, the at least one channel having a length that fluidly interconnects the fuel inlet and the fuel outlet, the side walls separated by a distance defining a channel width, the floor and the major surface separated by a distance defining a channel depth.

In the foregoing anode flow field plate, the at least one channel has a cross-sectional area that decreases exponentially along at least a portion of the channel length.

In a preferred embodiment of the foregoing anode flow field plate, the channel depth is substantially constant and the channel width decreases exponentially along at least a portion of the channel length.

In another preferred embodiment, the channel cross-sectional area decreases according to a natural exponential function. The channel width at a selected lengthwise position of the at least one channel is preferably proportional to a natural exponential function of the selected lengthwise position. The natural exponential function preferably comprises a constant derived from a fuel stoichiometry of the fuel cell. The constant is preferably a natural logarithm of a function of the fuel stoichiometry.

In another preferred embodiment, the channel width varies as a function of distance along the portion of the channel length such that:

$$W(x) = W(0)e^{-\frac{x}{L}ln\left(\frac{STOICH}{STOICH-1}\right)}$$

where $W(x)$ is the channel width at lengthwise position $x$, $x$ is a selected position along the channel length [m], $W(0)$ is the channel width at the fuel inlet, $L$ is the channel length, and STOICH is the fuel stoichiometry of the fuel cell.

In another embodiment, the cross-sectional area is equal to:

$$A(x) = (1.35 \times 10^{-14})C\frac{\rho_{fuel}\left((I \cdot Stoich) - I_d \int_0^x W(x)dx\right)(I \cdot Stoich)}{AVAIL_{H2}(x)}$$

where $A(x)$ is the channel cross-sectional area at lengthwise position $x$, $x$ is a selected position along the channel length [m], $C$ is the initial concentration of hydrogen (%), $\rho_{fuel}$ is the fuel stream density [kg/m$^3$], $I$ is the entire channel current load [A], $I_d$ is the current density [A/m$^2$], Stoich is fuel stoichiometry, $W(x)$ is the width of channel at position $x$ [m], and $AVAIL_{H2}(x)$ is hydrogen availability at position $x$ [kg·m/s$^2$].

In another preferred embodiment, the floor and the side walls are preferably non-orthogonal. The initial concentration of hydrogen (C) is preferably approximately 100%. The channel cross-sectional area preferably has a profile that is one of U-shaped, polygonal, semi-circular, varying fillet channel corner, varying chamfer channel corner, varying side wall slope angle channel, and varying floor bevel.

In another preferred embodiment, the at least one channel is a plurality of channels.

The above and other benefits are also achieved by a method of operating a fuel cell to produce electric power, in which the fuel cell comprises a membrane electrode assembly interposed between a first separator plate and a second separator plate, the membrane electrode assembly comprising an anode, a cathode, and a proton exchange membrane interposed between the anode and the cathode. The method comprises connecting the fuel cell to an electrical load; directing a fuel stream across the anode via at least one anode flow channel formed in a major surface of the first separator plate, wherein the at least one anode flow channel has a cross-sectional area that decreases along its length in the fuel flow direction; and directing an oxidant stream across the cathode via at least one cathode flow channel formed in a major surface of the second separator plate. The fuel stream is supplied to the at least one anode flow channel at a fuel stoichiometry such that there is substantially uniform current density across the fuel cell.

The above and other benefits are also achieved by a method of operating a fuel cell to produce electric power, in which the fuel cell comprises a membrane electrode assembly interposed between a first separator plate and a second separator plate, the membrane electrode assembly comprising an anode, a cathode, and a proton exchange membrane interposed between the anode and the cathode. The method comprises connecting the fuel cell to an electrical load; directing a fuel stream across the anode via at least one anode flow channel formed in a major surface of the first separator plate, wherein the at least one anode flow channel has a cross-sectional area that decreases along its length in the fuel flow direction; directing an oxidant stream across the cathode via at least one cathode flow channel formed in a major surface of the second separator plate. The fuel stream is supplied to the at least one anode flow channel at a fuel stoichiometry such that fuel availability at progressively downstream lengthwise positions along the at least one anode flow channel is kept substantially constant.

In the foregoing methods, the width of the at least one anode flow channel preferably decreases exponentially in the fuel flow direction. The fuel stream can comprise hydrogen. The fuel stream can also comprise substantially pure hydrogen. The fuel stream can also comprise methanol such that the fuel cell is a direct methanol fuel cell. The at least one cathode flow channel preferably has a cross-sectional area that decreases along its length in the oxidant flow direction, and the oxidant stream is supplied to the at least one cathode flow channel at an oxidant stoichiometry such that oxidant availability at progressively downstream lengthwise positions along the at least one cathode flow channel is kept substantially constant. The at least one anode flow channel can be a plurality of anode flow channels.

The above and other benefits are also achieved by a fuel cell anode flow field plate comprising: a reactant inlet; a reactant outlet; and at least one channel formed in a major surface of the plate, the at least one channel having a floor and a pair of side walls extending between the floor and the major surface, the at least one channel having a length that fluidly interconnects the reactant inlet and the reactant outlet, the side walls separated by a distance defining a channel width, the floor and the major surface separated by a distance defining a channel depth. The at least one channel extends in a meandering path between the reactant inlet and the reactant outlet and wherein the at least one channel has a cross-sectional area that decreases exponentially along at least a portion of the channel length.

In a preferred embodiment of the foregoing anode flow field plate, the channel depth is substantially constant and the channel width decreases exponentially along at least a portion of the channel length. The at least one channel preferably extends in a serpentine path between the reactant inlet and the reactant outlet, and the channel width decreases exponentially between the reactant inlet and the reactant outlet. The at least one channel can also extend in a sinusoidal path between the reactant inlet and the reactant outlet, and the channel width decreases exponentially between the reactant inlet and the reactant outlet. The at least one channel can be a plurality of channels. The plurality of channels is preferably arranged in a nested configuration and defines a flow field area, preferably a rectangular flow field area.

The above and other benefits are also achieved by a fuel cell anode flow field plate comprising: a reactant inlet; a reactant outlet; and at least one channel formed in a major surface of the plate, the at least one channel having a floor and a pair of side walls extending between the floor and the major surface, the at least one channel having a length that fluidly interconnects the reactant inlet and the reactant outlet, the side walls separated by a distance defining a channel width, the floor and the major surface separated by a distance defining a channel depth. The at least one channel has a cross-sectional area that is substantially constant along a first portion of the channel length and that decreases exponentially along a second portion of the channel length.

In a preferred embodiment of the foregoing anode flow field plate, channel depth is substantially constant and the channel width decreases along the second portion of the channel length. The channel width is preferably substantially constant and the channel depth preferably decreases exponentially along the second portion of the channel length. The channel portion having an exponentially decreasing cross-sectional area is preferably proximal the reactant inlet and the channel portion having a substantially constant cross-sectional area is proximal the reactant outlet. The channel portion having a substantially constant cross-sectional area is also preferably proximal the reactant inlet and the channel portion preferably has an exponentially decreasing cross-sectional area that is proximal the reactant outlet.

In another preferred embodiment, the plate has a substantially circular major planar surface, the reactant outlet is centrally disposed on the plate, and the reactant inlet is disposed at the circumferential edge of the plate.

In another preferred embodiment, the at least one channel is a plurality of channels. The at least one channel preferably extends in a meandering path between the reactant inlet and the reactant outlet. The at least one channel preferably extends in a serpentine path along at least a portion of the channel length. The at least one channel can also extend in a sinusoidal path along at least a portion of the channel length. The at least one channel can be a plurality of channels. The plurality of channels is preferably arranged in a nested configuration and defines a flow field area, preferably a rectangular flow field area.

The above and other benefits are also achieved by a fuel cell anode flow field plate comprising fuel cell reactant flow field plate comprising a reactant inlet, a reactant outlet, least one channel formed in a major surface of the plate, the at least one channel having a floor and a pair of side walls extending between the floor and the major surface, the at least one channel having a length that fluidly interconnects the reactant inlet and the reactant outlet, the side walls separated by a distance defining a channel width, the floor and the major surface separated by a distance defining a channel depth, and a rib extending lengthwise within at least a portion of the at least one channel, the rib having a top surface, a bottom surface and pair of side walls interconnecting the top and bottom surfaces, the rib side walls separated by a distance defining a rib width, the top surface and the bottom surface separated by a distance defining a rib depth, the rib side walls configured such that the at least one channel is divided into a pair of channels having cross-sectional areas that decrease exponentially along at least a portion of the channel length.

In a preferred embodiment of the foregoing anode flow field plate, the rib depth is substantially constant and the rib width increases exponentially along the channel length. The rib width is preferably substantially constant and the rib depth preferably increases exponentially along the channel length.

The above and other benefits are also achieved by a fuel cell anode flow field plate comprising: a reactant inlet; a reactant outlet; at least one channel formed in a major surface of the plate, the at least one channel having a floor and a pair of side walls extending between the floor and the major surface, the at least one channel having a length that fluidly interconnects the reactant inlet and the reactant outlet, the side walls separated by a distance defining a channel width, the floor and the major surface separated by a distance defining a channel depth; and a plurality of rib dots disposed within at least a portion of the at least one channel, each of the rib dots partially occluding the at least one channel, the rib dots arranged lengthwise within the at least one channel such that the at least one channel has a cross-sectional area for reactant flow that decreases exponentially along the channel portion.

In a preferred embodiment of the foregoing anode flow field plate, at least one of density and size of the rib dots increases along the at least one channel.

The above and other benefits are also achieved by a fuel cell anode flow field plate comprising: a reactant inlet; a reactant outlet; and at least one channel formed in a major surface of the plate, the at least one channel having a floor and a pair of side walls extending between the floor and the major surface, the at least one channel having a length that fluidly interconnects the reactant inlet and the reactant outlet, the side walls separated by a distance defining a channel width, the floor and the major surface separated by a distance defining a channel depth The at least one channel comprises a series of channel portions extending lengthwise from the reactant inlet to the reactant outlet, each succeeding channel portion in the series having a cross-sectional area that is decreased from that of a preceding channel portion so as to approximate an exponential decrease in cross-sectional area as the channel portions are traversed lengthwise from the reactant inlet to the reactant outlet.

In a preferred embodiment of the foregoing anode flow field plate, the at least one channel extends in a meandering path between the reactant inlet and the reactant outlet. The at least one channel preferably extends in a serpentine path along at least a portion of the channel length. The at least one channel can also extend in a sinusoidal path along at least a portion of the channel length. The at least one channel can be a plurality of channels formed in the plate major surface. The plurality of channels is preferably arranged in a nested configuration and defines a flow field area, preferably a rectangular flow field area.

DETAILED DESCRIPTION OF PREFERRED EMBODIMENT(S)

Figure 1A:
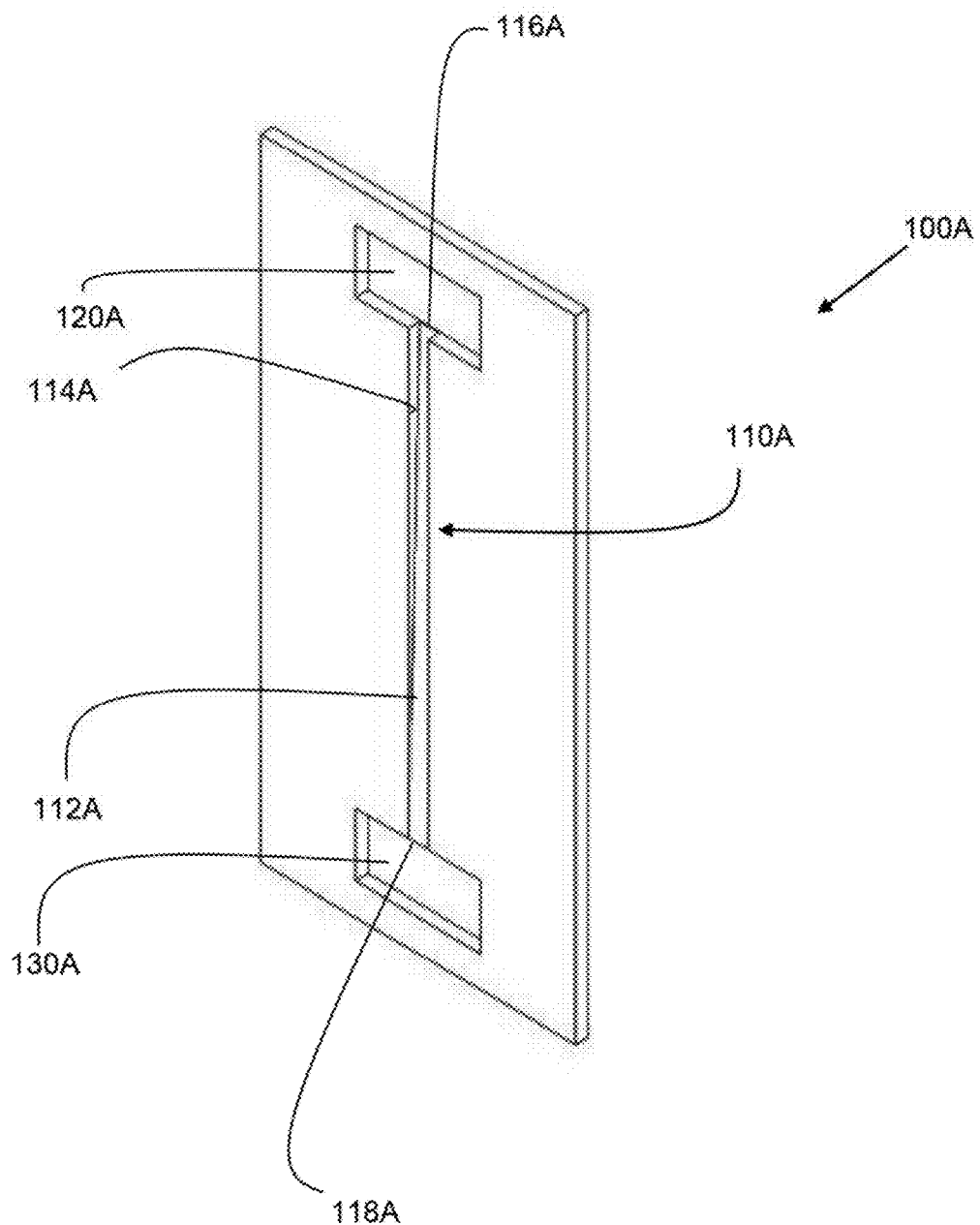
FIG. 1A is a simplified representation of an anode flow field plate comprising a flow channel that decreases in depth, with constant width, along its length.

Anode Flow Channels—for Fuel Cell Operation on Pure or Dilute Fuel

According to one embodiment, an anode flow field channel for a PEM fuel cell is designed for maintaining substantially constant fuel availability for the fuel cell electrochemical reaction along at least a portion of the length of the channel, for a given channel length and fuel stoichiometry, when the fuel cell is operating on either a pure or a dilute fuel stream.

We theorize that fuel availability is proportionate to fuel cell performance, and that uniform fuel availability promotes uniform current density, which is desirable for efficient fuel cell operation and improved performance. In the equations and description below, the fuel referred to is hydrogen, although the description would be applicable to other fuels such as methanol (although the value of the constant would change).

Hydrogen availability is a function of hydrogen mass flow and velocity, and is defined as follows:

$$AVAIL_{H2}(x) = \dot{m}_{H_2}(x) v(x) \quad (1a)$$

$$AVAIL_{H2}(x) = (1.35 \times 10^{-14}) C \frac{\rho_{fuel}\left((I \cdot Stoich) - I_d \int_0^x W(x)\,dx\right)(I \cdot Stoich)}{A(x)} \; [kg \cdot m/s^2] \quad (1b)$$

wherein,
$AVAIL_{H2}(x)$=Hydrogen availability at position x [kg·m/s$^2$]
$\dot{m}_{H_2}(x)$=Mass flow rate of hydrogen at position x [kg/s]
$v(x)$=Velocity of flow at position x [m/s]
$\rho_{fuel}$=Fuel stream density [kg/m$^3$]
$I_d$=Current density (constant) [A/m$^2$]
I=Entire channel current load [A]
Stoich=Fuel stoichiometry
$W(x)$=Width of channel at position x [m]
$A(x)$=Cross-sectional area of channel at position x [m$^2$]
C=Initial concentration of hydrogen (%)

Assumptions.

To derive equation (1b), the following assumptions were made:
1. Uniform current density: an objective is to provide an anode flow channel that can achieve or approach uniform current density;
2. Single phase state (gas form): to reduce thermodynamic complexity, liquid water produced by the fuel cell reaction is considered to be the only fluid in liquid form; all other masses are considered to be in gas form;
3. Evenly distributed hydrogen concentration, velocity, and mass flow across flow section: complex flow patterns are not considered in the interest of reducing mass flow complexity;
4. Reaction is considered to be local to the flow channel only: the model does not consider above-rib activity (namely, in the region between channels where the MEA is in contact with plate, and is not directly exposed to fuel flowing in the flow channel);
5. Steady state system: the reaction and flows are considered to be steady state, or unchanging.

H2 Availability Equation Derivation.

Derivation of equation (1b) from equation (1a) is described as follows:

Definition of additional variables used in the derivation:
x=Position along channel length [m]
$\dot{m}_{H_2\,consumed}(x)$=Mass flow rate of hydrogen consumed up to position x [kg/s]
$\dot{V}_{fuel}(x)$=Volumetric flow rate of fuel stream at position x [SLPM]
$I_{acc}(x)$=Accumulated current up to position x [A]

As noted above, hydrogen availability is defined as the hydrogen mass flow rate by velocity [kg·m/s$^2$]:

$$AVAIL_{H2}(x) = \dot{m}_{H_2}(x) v(x) \quad (1a)$$

In the anode flow channel, hydrogen is consumed as the fuel stream moves along the flow channel. The mass flow rate of hydrogen at a given position x along the channel is:

$H_2$ mass flow at $x$=$H_2$ mass flow at inlet–$H_2$ mass flow consumed to $x$:

$$\dot{m}_{H_2}(x) = \dot{m}_{H_2}(0) - \dot{m}_{H_2\,Consumed}(x)$$

Where $\dot{m}_{H_2}(0) = (1.16 \times 10^{-7})(C) \rho_{fuel} \cdot I \cdot Stoich$ [kg/s]
Where $\dot{m}_{H_2\,Consumed}(x) = (1.16 \times 10^{-7})(C) \rho_{fuel} \cdot I_{acc}(x)$ [kg/s]

$$\dot{m}_{H_2}(x) = (1.16 \times 10^{-7})(C) \rho_{fuel}((I \cdot Stoich) - I_{acc}(x)) \; [kg/s] \quad (2a)$$

These equations are based on a well-known empirically derived fuel cell reaction fundamental principle: Hydrogen flow [SLPM]=0.006965×fuel stoichiometry (Stoich)×current load (I). The value $1.16 \times 10^{-7}$ (units m$^3$/A·s) is obtained by converting 0.006965 [SLPM] to [m$^3$/s].

The velocity of the fuel stream at a given position x along the channel is:

Velocity at $x =$ (2b)

Fuel stream volumetric flow rate at $x$/Flow area at $x$ $$v(x) = \frac{\dot{V}_{fuel}(x)}{A(x)}$$

$$v(x) = \frac{(1.16 \times 10^{-7}) I \cdot Stoich}{A(x)} \; [m/s]$$

Combining equations (2a) and (2b) then gives:

$$AVAIL_{H2}(x) = \quad (1b)$$

$$(1.35 \times 10^{-14}) C \frac{\rho_{fuel}((I \cdot Stoich) - I_{acc}(x))(I \cdot Stoich)}{A(x)} \; [kg \cdot m/s^2]$$

Where $I_{acc}(x) = I_d \int_0^x W(x)\,dx$ [A]

$$AVAIL_{H2}(x) = (1.35 \times 10^{-14})$$

$$C \frac{\rho_{fuel}\left((I \cdot Stoich) - I_d \int_0^x W(x)\,dx\right)(I \cdot Stoich)}{A(x)} \; [kg \cdot m/s^2]$$

Equation (1b) shows that increasing the hydrogen availability can be achieved by:
Increasing current density ($I_d$)
Increasing fuel stoichiometry (Stoich)

Increasing in channel length (L)
Increasing average channel width ($\overline{W}$)
Increasing fuel stream density ($\rho_{fuel}$)
Decreasing channel depth (D)

As previously discussed, it is desirable to manufacture a fuel cell that can achieve substantially uniform current density in operation. Assuming that uniform current density can be achieved by maintaining uniform fuel and oxygen availability along the length (x) of the anode and cathode flow channels respectively, equation (1b) shows that holding hydrogen availability constant along x requires changes in flow area. The flow area A(x) for each position along the channel length can be determined by solving equation (1b) for A(x) as shown in equation (7) below. For a rectangular flow channel cross-section (namely, channel with a straight floor and side walls), the channel width and depth can be determined at any given lengthwise position x in the channel by defining area A(x) as the product of width W(x) and depth D(x), then changing the channel width or depth (W or D) along channel length x:

$$AVAIL_{H2}(x) = (1.35 \times 10^{-14}) \quad (3)$$

$$C \frac{\rho_{fuel}\left((I \cdot Stoich) - I_d \int_0^x W(x)\,dx\right)(I \cdot Stoich)}{D(x)W(x)} \quad [kg \cdot m/s^2]$$

Anode Flow Channel Having Varied Depth Profile

An anode flow channel can be manufactured with a constant width and a varying depth profile to achieve constant hydrogen availability. Such a channel profile is calculated as follows:

Using the hydrogen availability equation as previously derived in equation (3):

$$AVAIL_{H2}(x) = (1.35 \times 10^{-14}) \quad (3)$$

$$C \frac{\rho_{fuel}\left((I \cdot Stoich) - I_d \int_0^x W(x)\,dx\right)(I \cdot Stoich)}{D(x)W(x)} \quad [kg \cdot m/s^2]$$

and solving for channel depth D(x):

$$D(x) = (1.35 \times 10^{-14})C \frac{\rho_{fuel}\left((I \cdot Stoich) - I_d \int_0^x W(x)\,dx\right)(I \cdot Stoich)}{AVAIL_{H2}(x)W(x)}$$

Assuming constant hydrogen availability $Avail_{H2}$ and channel width W, the following equation 4 is obtained:

$$\text{where } \int_0^x W(x)\,dx = W \cdot x \quad (4)$$

$$\text{where } I = I_d \cdot W \cdot L$$

$$D(x) = (1.35 \times 10^{-14})$$

$$C \frac{\rho_{fuel}((I_d \cdot W \cdot L \cdot Stoich) - (I_d \cdot W \cdot x))(I_d \cdot W \cdot L \cdot Stoich)}{AVAIL_{H2} \cdot W}$$

$$D(x) = \frac{(1.35 \times 10^{-14})C \cdot \rho_{fuel} \cdot Stoich \cdot L \cdot I_D^2 \cdot W}{AVAIL_{H2}}(L \cdot Stoich - x) \quad [m]$$

$$D(x) = D(0)\left(1 - \frac{x}{L \cdot Stoich}\right) \quad [m]$$

The result is the depth profile is linear to x.

FIG. 1A is a simplified representation of an anode flow field plate 100A comprising a flow channel 110A that decreases in depth, with constant width, along its length. A channel profile can be defined by solving for D(x) in equation 4 at each position (x) along the length of the channel, given a specified operating fuel stoichiometry STOICH and channel length L, and assuming a constant channel width. Referring to FIG. 1A, the resulting anode channel 110A extends between fuel supply manifold opening 120A and discharge manifold opening 130A, and has a linearly decreasing depth floor 112A from inlet 116A to outlet 118A, with straight (parallel) side walls 114A.

For the varied depth approach, to increase hydrogen availability along the channel requires, ordered in effectiveness, an:
  increase in current density ($I_d$);
  increase in fuel stoichiometry (Stoich);
  increase in channel length (L);
  increase in channel width (W);
  increase in fuel stream density ($\rho_{fuel}$); or,
  decrease in average depth ($\overline{D}$)

Anode Flow Channel Having Varied Width Profile

Given the desire to reduce or minimize the thickness of the separator plates in a fuel cell stack, it is desirable to keep the depth of the channel shallow. Therefore, instead of varying the depth of the channel, which would require a sufficiently thick plate to accommodate the deepest part of the channel, it can be preferred to keep the channel depth constant and to vary just the width of the channel to achieve constant hydrogen availability along the length of the channel.

Again, the $H_2$ availability equation (3) is:

$$AVAIL_{H2}(x) = (1.35 \times 10^{-14}) \quad (3)$$

$$C \frac{\rho_{fuel}\left((I \cdot Stoich) - I_d \int_0^x W(x)\,dx\right)(I \cdot Stoich)}{D(x)W(x)} \quad [kg \cdot m/s^2]$$

Applying constant hydrogen availability $Avail_{H2}$ and channel depth $$\text{where } I = I_d \int_0^L W(x)\,dx$$

$$AVAIL_{H2}(x) =$$

$$(1.35 \times 10^{-14})C \frac{\rho_{fuel}\left(\begin{array}{c} Stoich \cdot I_d \int_0^L W(x)\,dx - \\ I_d \int_0^x W(x)\,dx \end{array}\right)\left(I_d \cdot \int_0^L W(x)\,dx \cdot Stoich\right)}{D \cdot W(x)}$$

Solving for W(x), equation (5) is as follows:

$$\frac{W(x)}{\left(\begin{array}{c} Stoich \cdot I_d \int_0^L W(x)\,dx - \\ I_d \int_0^x W(x)\,dx \end{array}\right)\left(I_d \cdot \int_0^L W(x)\,dx \cdot Stoich\right)} = \quad (5)$$

$$\frac{\rho_{fuel}}{(1.35 \times 10^{-14})C \cdot AVAIL_{H2} \cdot D}$$

Equation (5) can be simplified to obtain $$W(x) = W(0)e^{-\frac{x}{L}\ln\left(\frac{STOICH}{STOICH-1}\right)} \quad [m] \qquad (6)$$

Figure 1B:
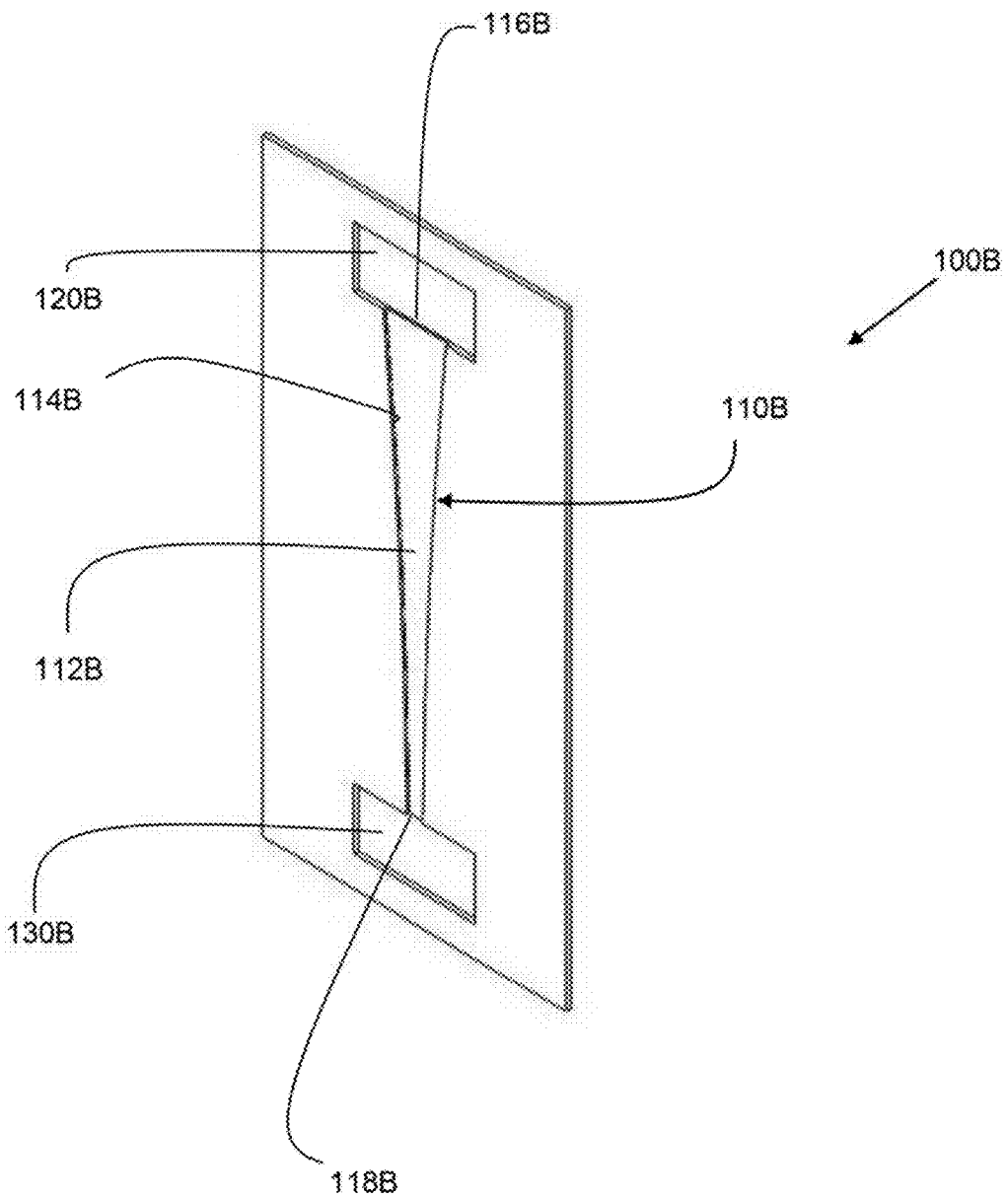
FIG. 1B is a simplified representation of an anode flow field plate comprising a flow channel that decreases exponentially in width, with constant depth, along its length.

FIG. 1B is a simplified representation of an anode flow field plate 100B comprising a flow channel 110B that decreases in width along its length. A channel profile can be defined by solving for W(x) in equation (6) at each position (x) along the length of the channel, given a specified operating fuel stoichiometry STOICH and channel length L, and assuming a flat channel floor (constant depth). Referring to FIG. 1B, the resulting anode channel 110B extends between fuel supply manifold opening 120B and discharge manifold opening 130B, and has a constant depth floor 112B with convexly curved side walls 114B that converge inwards from inlet to outlet. The walls 114B converge inwards towards an outlet end 118B with an inlet 116B having the largest width and the channel profile delineating at a diminishing rate. That is, the channel width decreases exponentially along the length of the channel from the inlet to the outlet according to the equation (6). It would be possible for one of the side walls to be straight and the other to be convexly curved.

Figure 2:
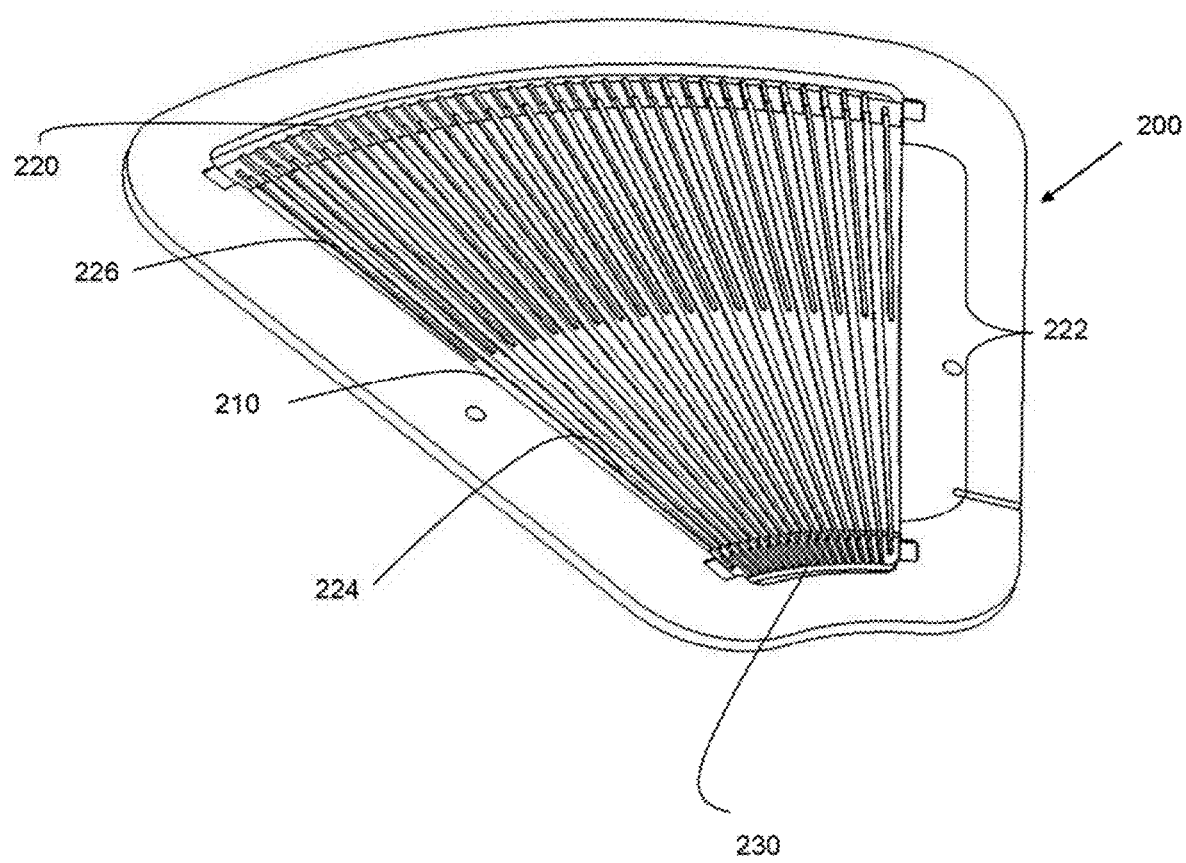
FIG. 2 shows a trapezoidal anode flow field plate comprising multiple flow channels that decrease exponentially in width along their length.

Referring to FIG. 2, multiple channels 210 having the channel profile shown in FIG. 1B can be applied to a separator plate 200, to form an anode flow field 222 extending between fuel supply manifold opening 220 and discharge manifold opening 230. The anode flow field 222 is arrayed in a generally trapezoidal geometry to enable separating ribs 224 to have a relatively even width along their length; it can be seen that using a conventional rectangular flow field geometry with narrowing flow channels would require the ribs to also have a narrowing profile. Such a rib profile would result in significant amounts of MEA contacting the ribs, resulting in reduced membrane active area and less efficient usage of membrane material. Since MEA material is relatively expensive, it can be desirable to maximize the MEA active area using a generally even rib width. Using a generally trapezoidal flow field geometry also enables the flow field 222 to fit onto a trapezoidal separator plate 200, or to fit onto a traditional rectangular separator plate with room to spare on the separator plate for other components such as manifolding (not shown).

The separator plate 200 includes partial ribs 226 located at the inlet region of each channel 210. The partial ribs 226 serve to reduce the distance between channel side walls, and serve as a bridging or support structure for the adjacent MEA (not shown).

Anode Flow Channel Having Varied Cross-Sectional Area

If alternate techniques are used to generate a constant $H_2$ availability profile without a rectangular channel cross-section (flat floor, vertical walls), then a new variable $W_R(x)$ is introduced into equation (1(b)). $W_R(x)$ is defined as the width of the hydrogen reaction area at a given lengthwise position x along the channel (for a rectangular channel cross-section, $W_R(x)=W(x)$ as the width of the channel that is exposed to the adjacent MEA or gas diffusion layer is the same as the channel width). A(x) is then calculated through iteration based on channel profile. The resulting equation (7) encompasses various channel cross-sectional flow shapes that maintain a constant $H_2$ availability along the channel length. For example, alternative channel cross-sectional profiles can include, but are not limited to: U-shaped channel, polygonal channel, semi-circular channel, varying fillet channel corner, varying chamfer channel corner, varying side wall slope angle channel, or varying floor bevel.

$$A(x) = (1.35 \times 10^{-14})C\frac{\rho_{fuel}\left((1\cdot Stoich) - I_d \int_0^x W(x)dx\right)(1\cdot Stoich)}{AVAIL_{H2}(x)} \quad [m^2] \qquad (7)$$

The preferred anode flow channel dimensions or characteristics based on the equations set forth above are applicable to operation on pure or dilute fuels as the equations take into account concentration (C).

Improved Reactant Flow Field Designs

As used herein, the terms "e-flow", "based on e-flow", "based on the e-flow equations", "in accordance with e-flow principles", "e-flow channels", and similar phrases are intended to refer to reactant flow channel dimensions, flow characteristics and/or flow field designs that are selected based on the equations and description set forth above with respect to the anode, and in U.S. Pat. No. 7,838,169 with respect to the cathode. Such channels or flow field designs can be incorporated into the anode and cathode flow field plates or other components of a fuel cell.

Flow fields based on e-flow principles are more likely to be adopted if they can be accommodated within conventional flow field plate geometries and into conventional fuel cell stack architectures (which typically have rectangular flow field plates). Flow channels where the depth profile changes along the length of the channel (such as shown in FIG. 1A) can be accommodated by using the existing flow field design (pattern) and merely altering the depth profile of the channels along their length (keeping the channel width and ribs the same as in the original flow field design). However, plates with channels where the depth profile changes are generally more challenging to fabricate. They also result in a need for thicker plates, in order to accommodate the deepest part of the channel, leading to decreased fuel cell stack power density and higher cost.

Figure 3:
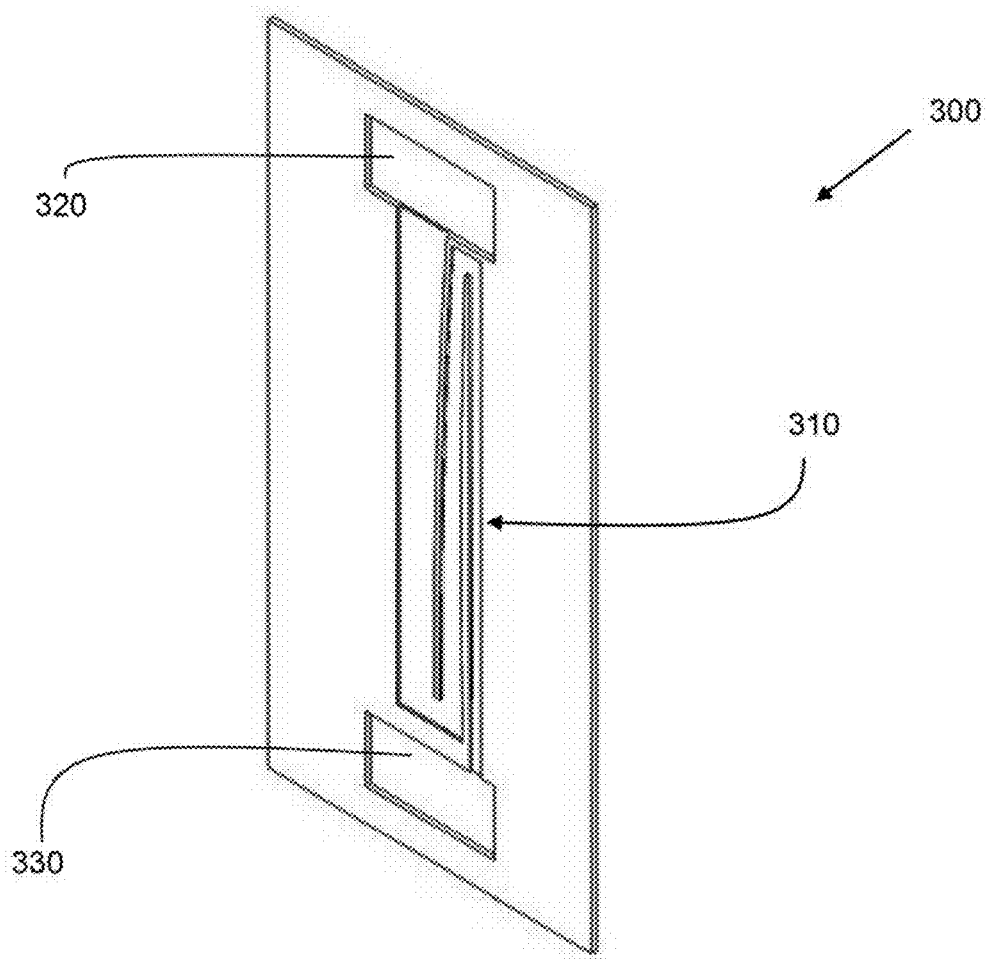
FIG. 3 is a simplified representation showing an example of how a serpentine flow channel, in which the channel width varies, can be applied to a rectangular flow field plate.
Figure 4A:
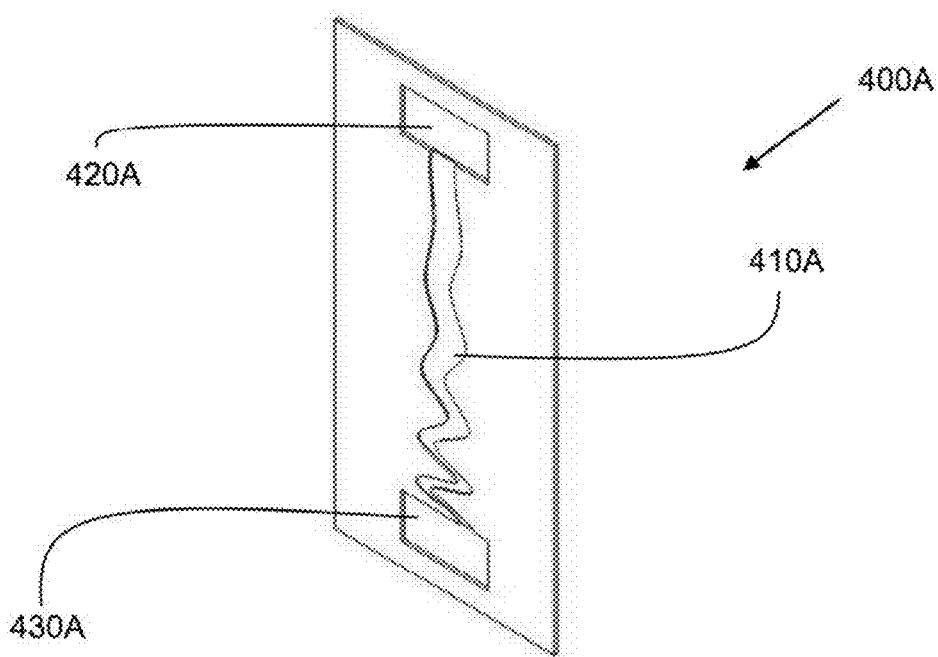
FIG. 4A is a simplified representation showing an example of how a wavy flow channel, in which the channel width varies, can be applied to a rectangular flow field plate.
Figure 4B:
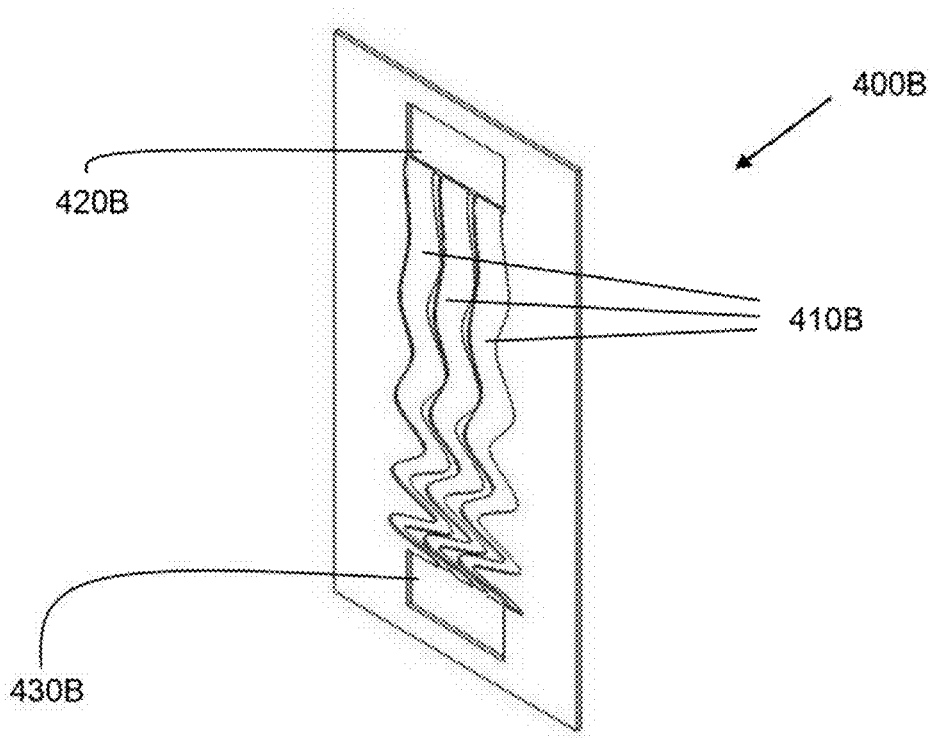
FIG. 4B is a simplified representation showing an example of how multiple wavy flow channels can be nested on a rectangular flow field plate.
Figure 5A:
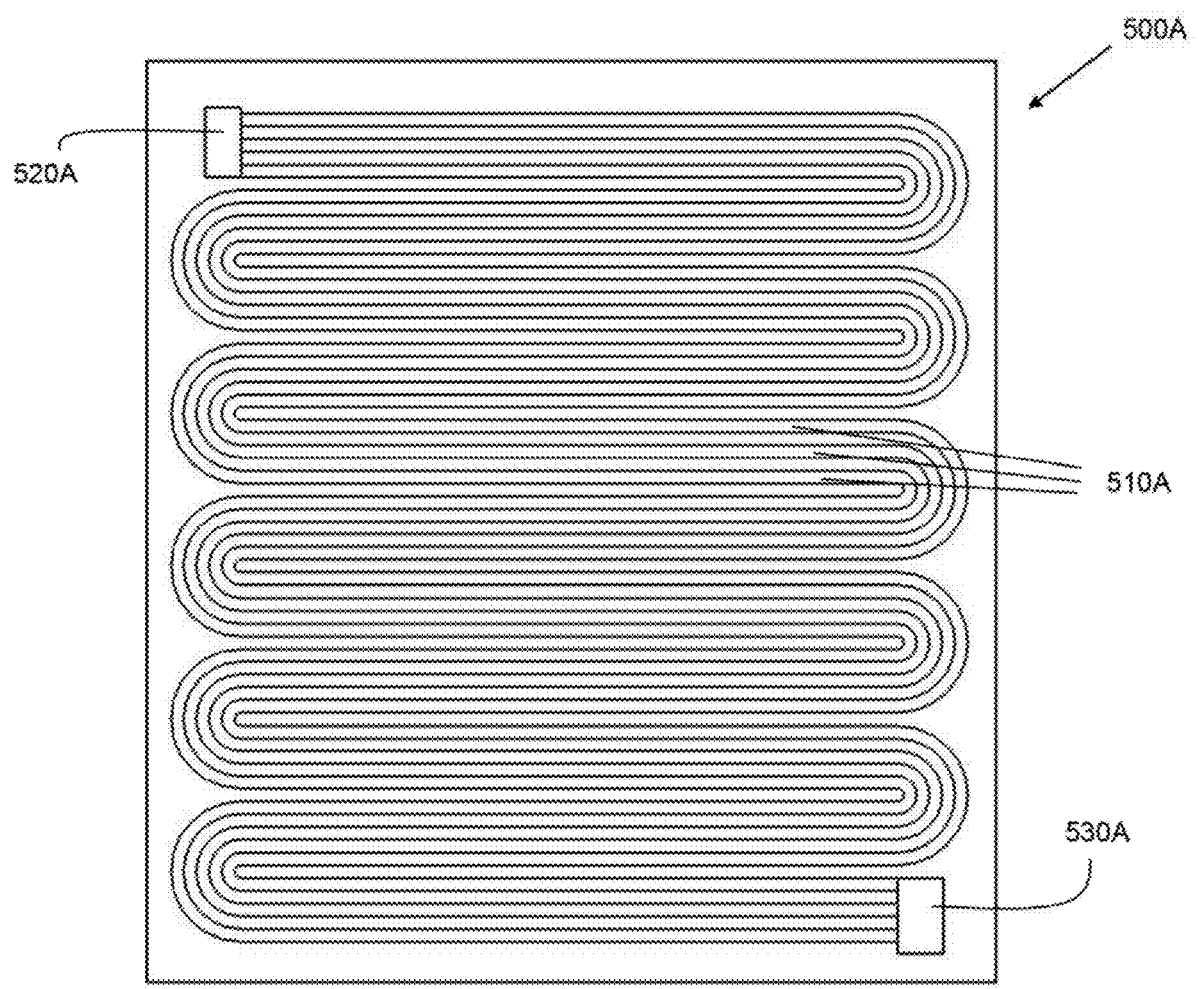
FIG. 5A (prior art) shows a square flow field plate comprising a conventional serpentine flow field with 3 flow channels extending between a supply manifold opening and a discharge manifold opening.
Figure 5B:
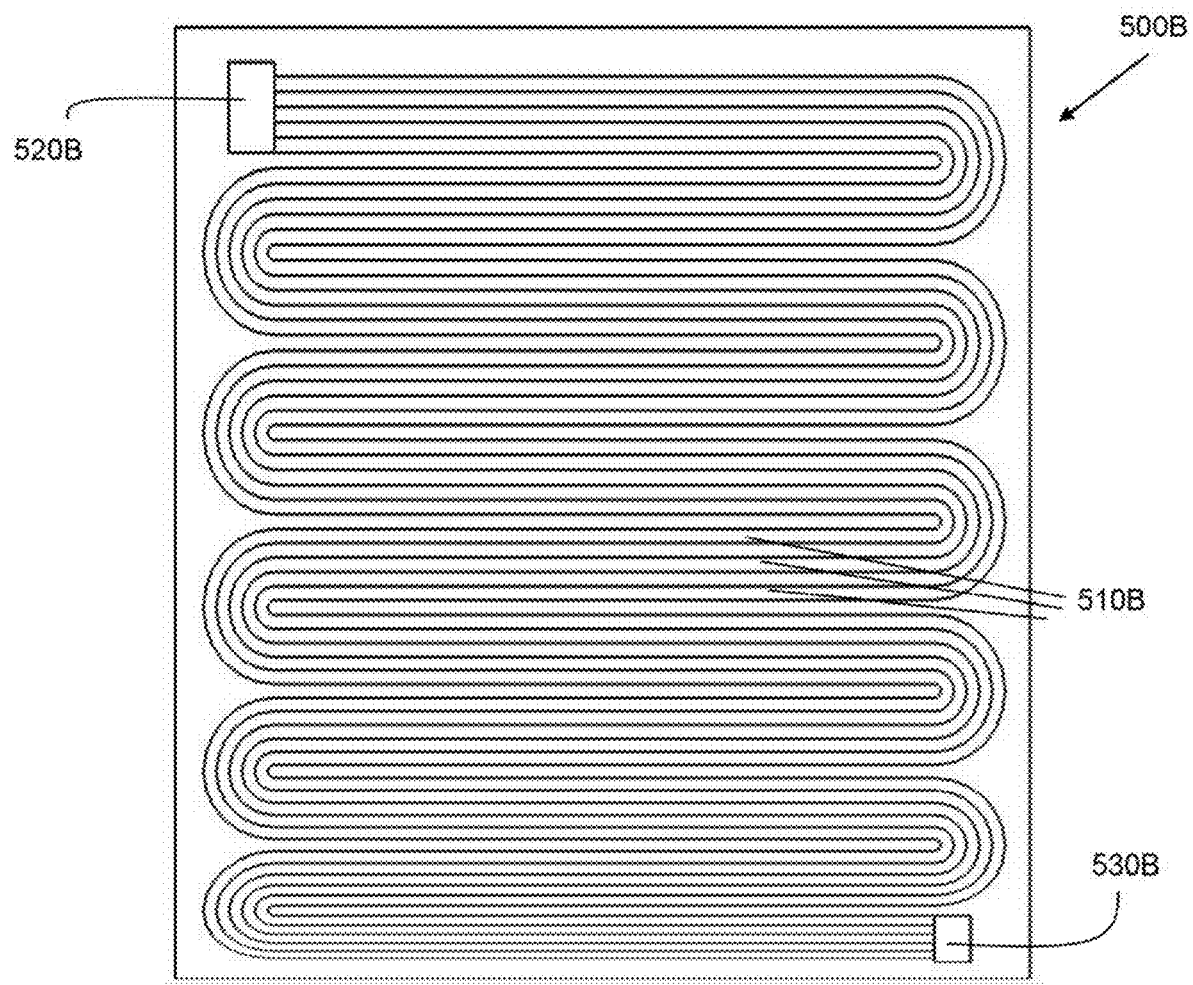
FIG. 5B shows a similar serpentine flow field to FIG. 5A, but where the width of each serpentine flow channel decreases exponentially along its length.

FIGS. 3-5 show some examples of ways in which flow fields based on e-flow where the flow channel width varies, can be applied to a rectangular reactant flow field plate. FIG. 3 shows a rectangular reactant flow field plate 300 with a serpentine channel 310 where the channel width is decreasing exponentially as it zig-zags across the plate between supply manifold opening 320 and discharge manifold opening 330. FIG. 4A shows a rectangular reactant flow field plate 400A with a wavy channel 410A extending between supply manifold opening 420A and discharge manifold opening 430A, where the channel width is decreasing exponentially along its length. In FIG. 4A the amplitude of the path of the center-line of the flow channel 410A increases as the width of the channel decreases, so that the channel still occupies most of the width of the plate 400A. Making the variable width e-flow channel serpentine or wavy, rather than straight, allows the channel to occupy a more rectangular shape making more efficient use of the surface area of the plate. FIGS. 3 and 4A show a single flow channel, however, it is apparent that such channels can be repeated or arrayed across a rectangular plate so that a large portion of the plate area can be "active area" (for example, so that a large portion of the plate surface is covered in channels, with a large open channel area exposed to the adjacent electrode or MEA). FIG. 4B shows a rectangular reactant flow field plate 400B with multiple flow channels 410B (like flow channel 410A of FIG. 4A repeated) extending between supply manifold opening 420B and discharge manifold opening 430B, arranged so that the channels nest together. This example describes a single direction array (x-axis shown) resulting in an overall approximately rectangular active area, and maintains substantially uniform rib width (channel spacing). This differs from a radial or arced array pattern resulting from maintaining substantially uniform rib width in the straight e-flow channel profile of FIG. 2. FIG. 5A shows a square flow field plate 500A comprising a conventional (prior art) serpentine flow field with three flow channels 510A extending between supply manifold opening 520A and discharge manifold opening 530A. FIG. 5B shows a similar serpentine flow field plate 500B, but where the width of each serpentine channel 510B decreases exponentially along its length as it extends from supply manifold opening 520B to discharge manifold opening 530B.

Another approach is to take a radial array of channels of decreasing width, such as is shown in FIG. 2, and incorporate a 90° "fan" of such channels on a square plate with discharge manifold opening in one corner (where narrower ends of the channels converge) and supply manifold opening in the opposite corner, with a feed header extending along two sides of the square plate. Similarly a 180° fan of channels could be incorporated on a rectangular plate. Rectangular active area shapes are generally preferred for flow field plates (and other fuel cell components), as they generally make more efficient use of bulk sheet materials with less waste during manufacturing. It is possible to efficiently "nest" circular or trapezoidal plates onto a rectangular sheet, however there is generally more unused area than with rectangular cut shapes.

Improvements in fuel cell performance can be obtained by incorporating e-flow along only a portion of the length of the reactant flow channel. The performance improvements are not necessarily as great as if e-flow is employed along the entire channel length, but such flow field designs can in some cases provide most of the benefit, and can allow more efficient use of the plate area. For example, current density maps of conventional flow fields, such as those having serpentine or straight flow channels, generally show reasonable uniformity of current density near the supply manifold followed by a reduction in current density further downstream. This indicates that e-flow can provide the most benefit if used in the latter portion of the channel length, where the current density is more sensitive to reactant availability. However, it is possible to incorporate e-flow into the flow field near the beginning of the channel length followed by a downstream section that has conventional flow channels. This embodiment can be used to hold the reactant availability substantially constant over an initial portion of the fuel cell active area, and allow the downstream "conventional" section to operate as though there was no upstream active area. In this way the e-flow region could be regarded as a power generating "manifold" for the subsequent conventional flow field.

Figure 6A:
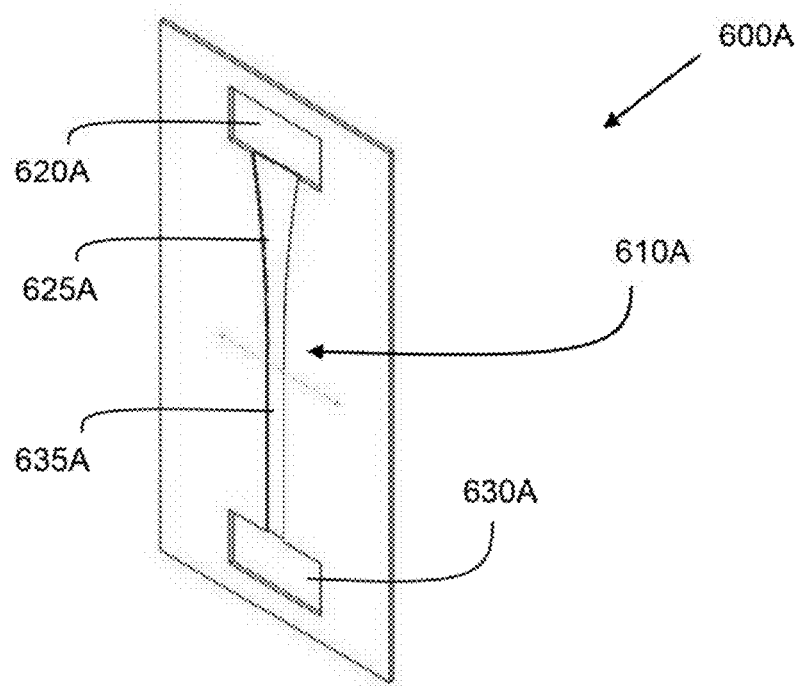
FIG. 6A is a simplified representation of a flow field plate comprising a flow channel that decreases exponentially in width for a first portion of the channel length and is then constant for a second portion of the channel
Figure 6B:
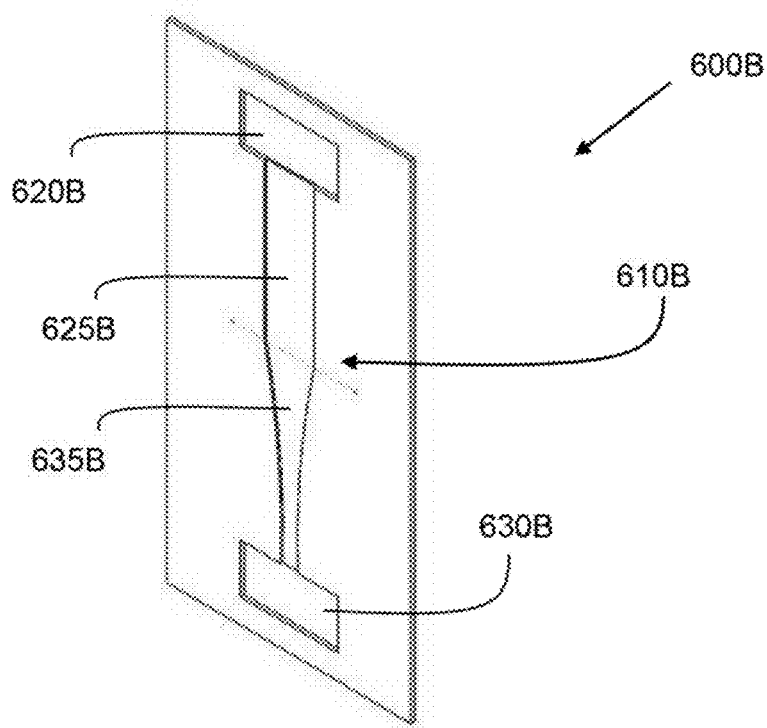
FIG. 6B is a simplified representation of a flow field plate comprising a flow channel that is constant in width a first portion of the channel length and decreases exponentially for a second portion of the channel length.
Figure 7A:
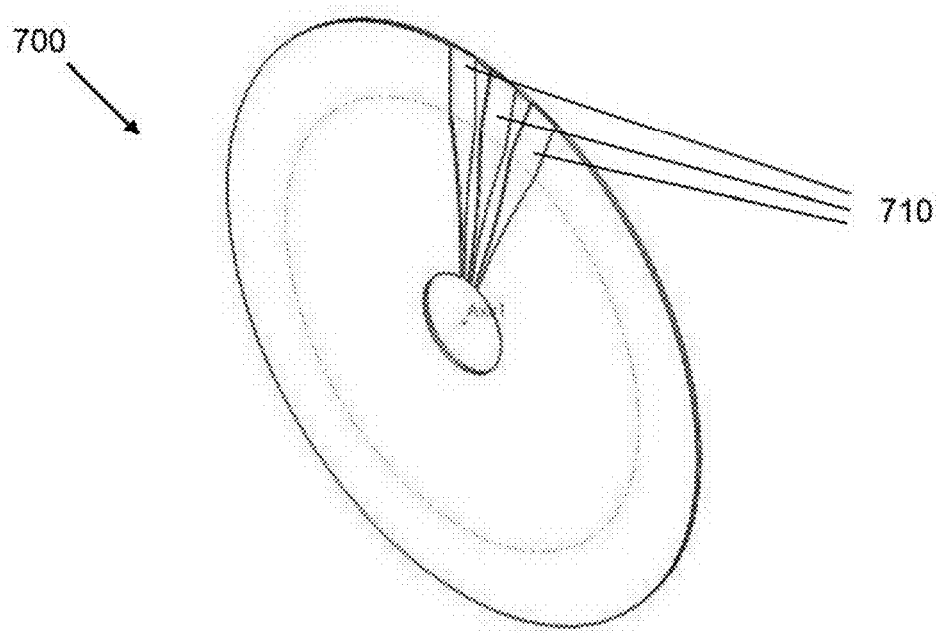
FIG. 7A is a simplified representation showing how 3 flow channels of the type shown in FIG. 6B can be arranged radially on an annular flow field plate.
Figure 7B:
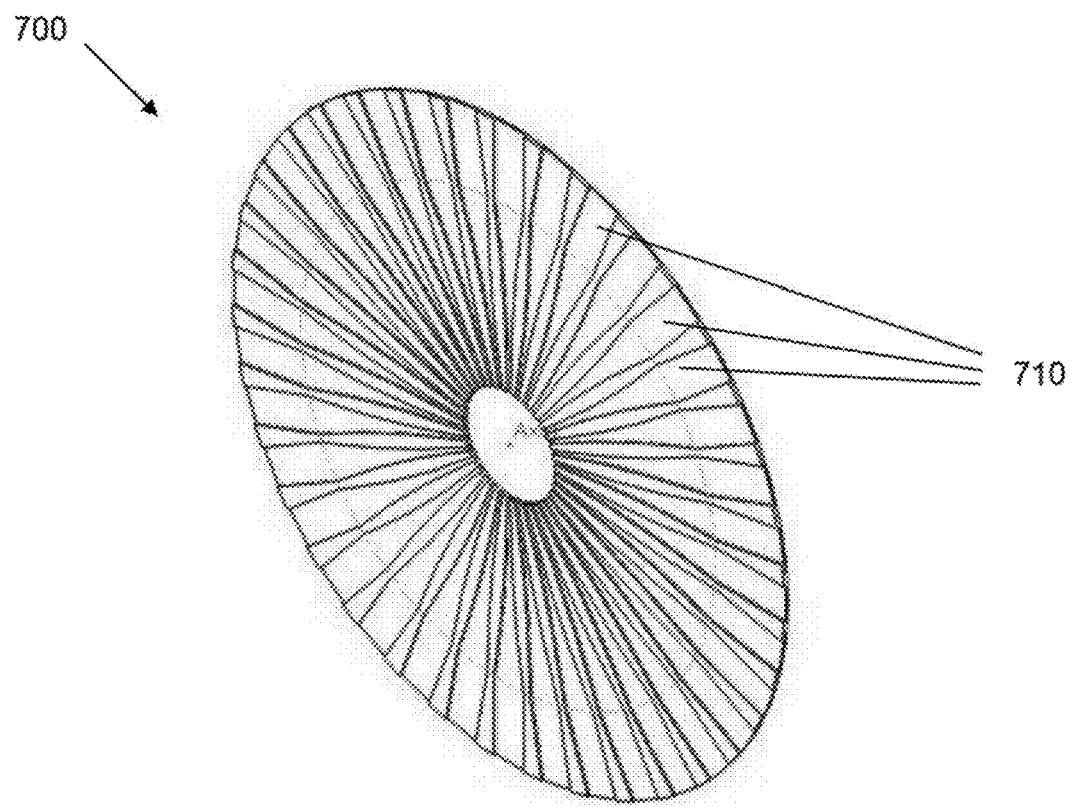
FIG. 7B is a simplified representation showing how multiple flow channels of the type shown in FIG. 6B can be arranged in a radial array on an annular flow field plate.
Figure 8:
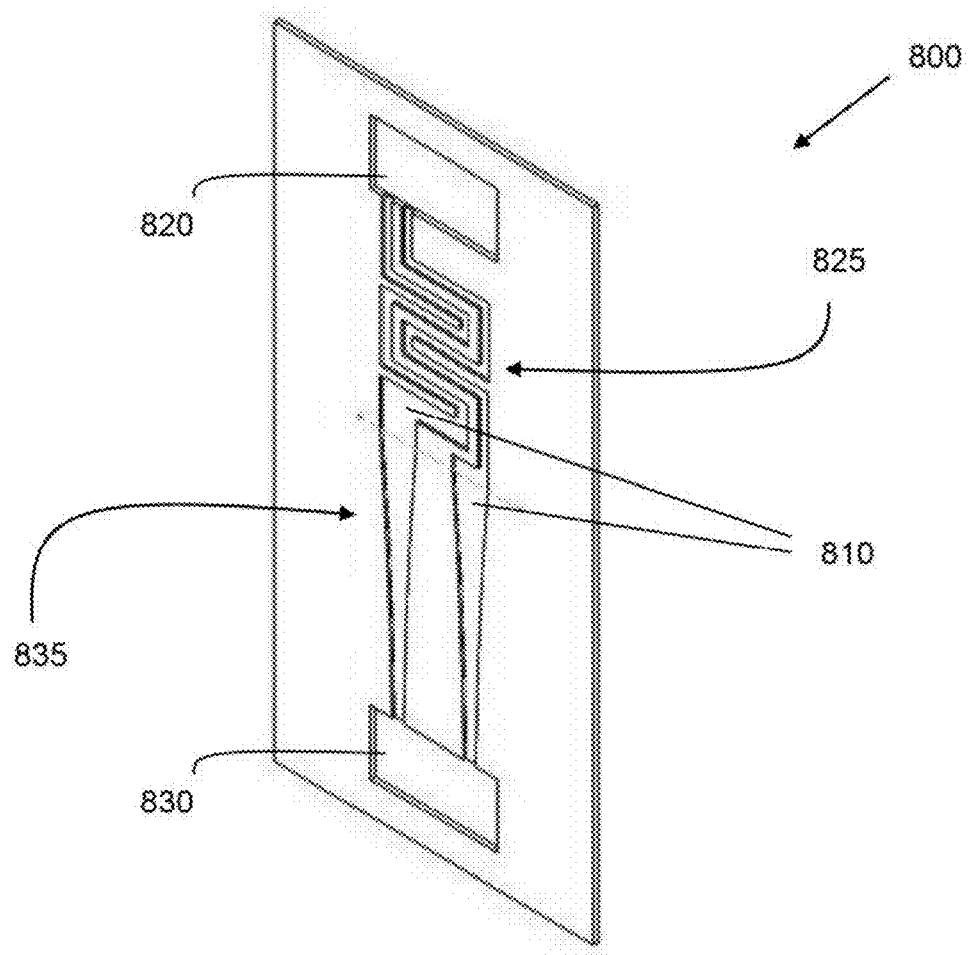
FIG. 8 is a simplified representation of a flow field plate comprising two flow channels that are initially serpentine with constant width, and then the channel width decreases exponentially for a second portion of the channel length.

FIGS. 6-8 show some examples where the flow channel width varies along just a portion of the length of the channel. FIG. 6A shows a rectangular reactant flow field plate 600A with a flow channel 610A extending between supply manifold opening 620A and discharge manifold opening 630A. Similarly, FIG. 6B shows a rectangular reactant flow field plate 600B with a flow channel 610B extending between supply manifold opening 620B and discharge manifold opening 630B. In FIG. 6A the flow channel width decreases exponentially for a first portion 625A of the channel length (near the supply manifold), and is then constant for a second portion 635A of the channel length (towards the discharge manifold). Conversely, in FIG. 6B the flow channel width is constant for a first portion 625B and decreases exponentially for a second portion 635B of the channel length.

FIGS. 7A & 7B show how flow channels 710 of the type shown in FIG. 6B can be arranged radially on an annular reactant flow field plate 700. FIG. 7A is a partial view showing just a few channels 710, and FIG. 7B shows a complete flow field.

Figure 9:
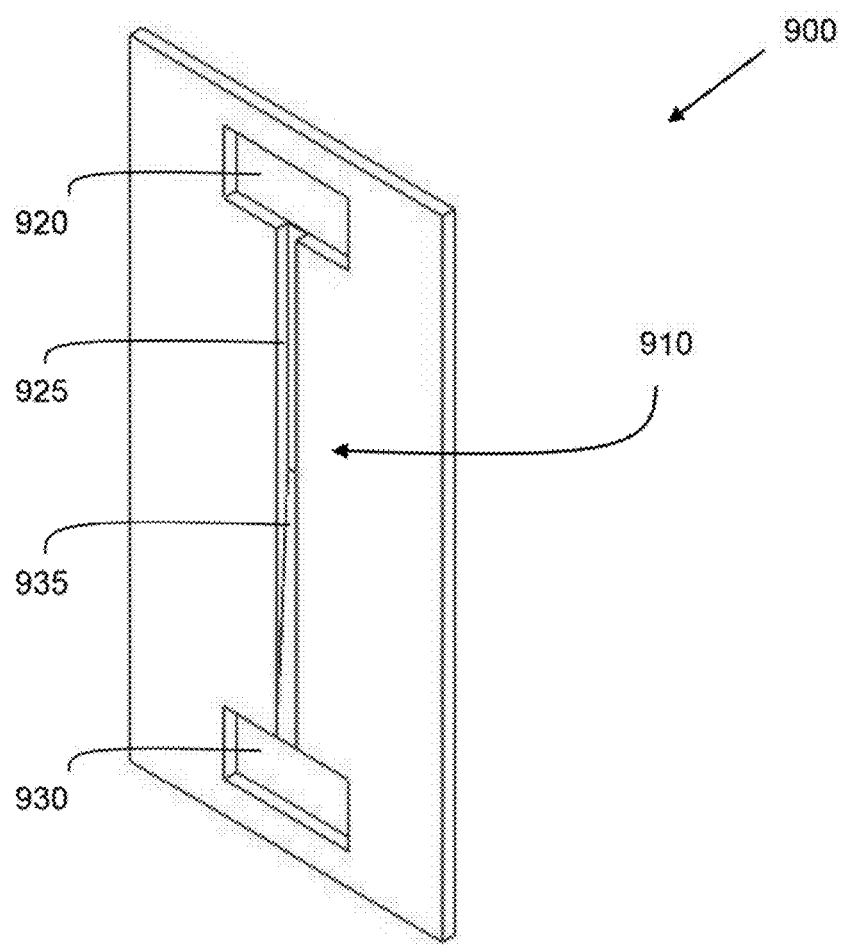
FIG. 9 is a simplified representation of a flow field plate comprising a flow channel in which the channel depth is constant along a first portion of the channel length and then decreases along second a portion of the channel length.

FIG. 8 shows a reactant flow field plate 800 comprising two flow channels 810. The channels are initially serpentine with constant width in portion 825 near the supply manifold opening 820, and then, after abruptly increasing, the channel width decreases exponentially for a second portion 835 of the channel length (towards discharge manifold opening 830). FIG. 9 shows an example of a reactant flow field plate 900 comprising a flow channel 910 extending between a supply manifold opening 920 and a discharge manifold opening 930. The flow channel depth is constant along a first portion 925 of the channel length and then decreases along a second portion 935 of the length of the channel 910.

In some embodiments, the flow channels can incorporate an e-flow based variation in both width and depth along their entire length, or a portion of their length.

Figure 10A:
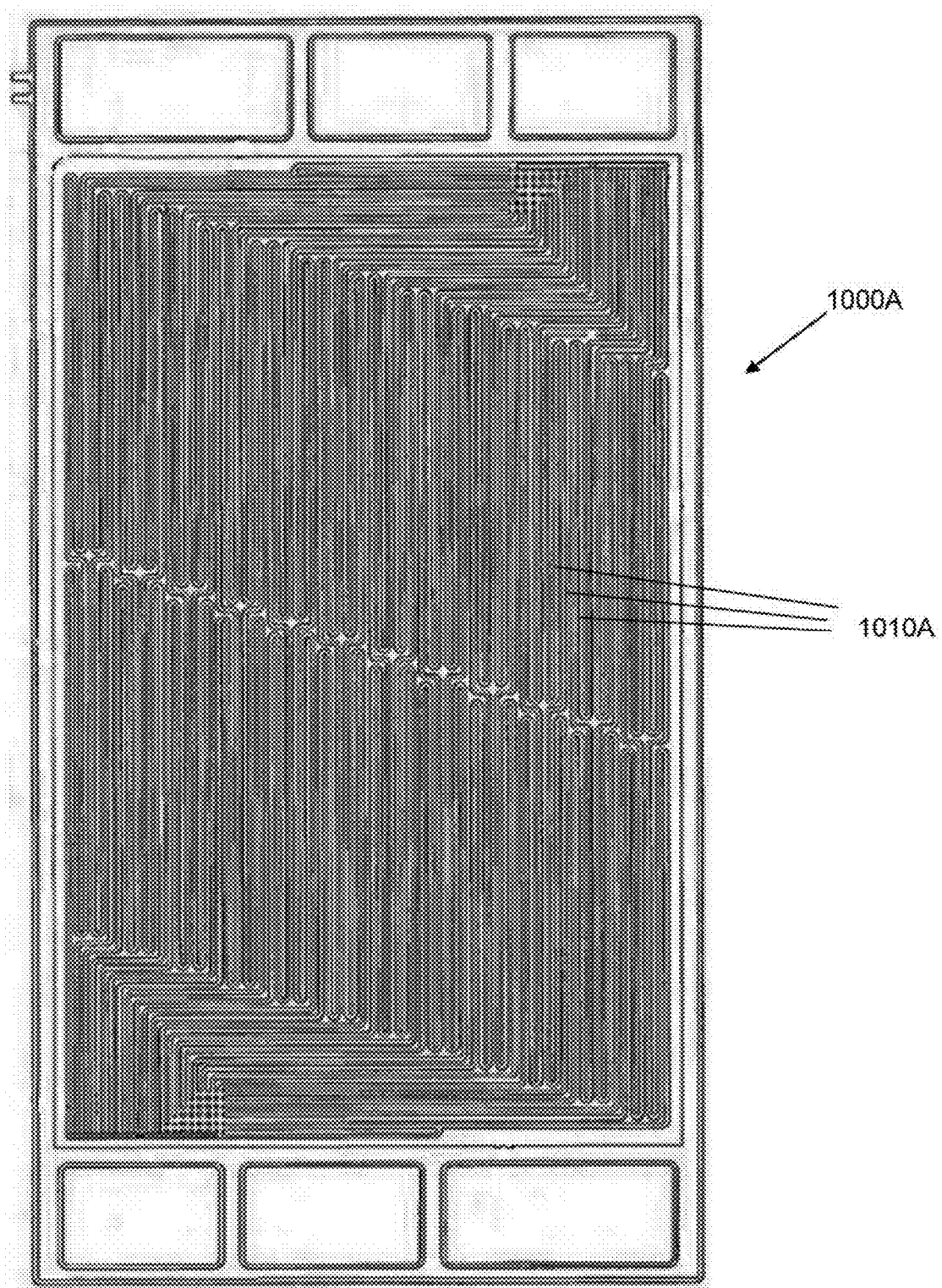
FIG. 10A (prior art) shows a rectangular flow field plate comprising a multi-channel serpentine flow field extending between a supply and a discharge manifold opening.
Figure 10B:
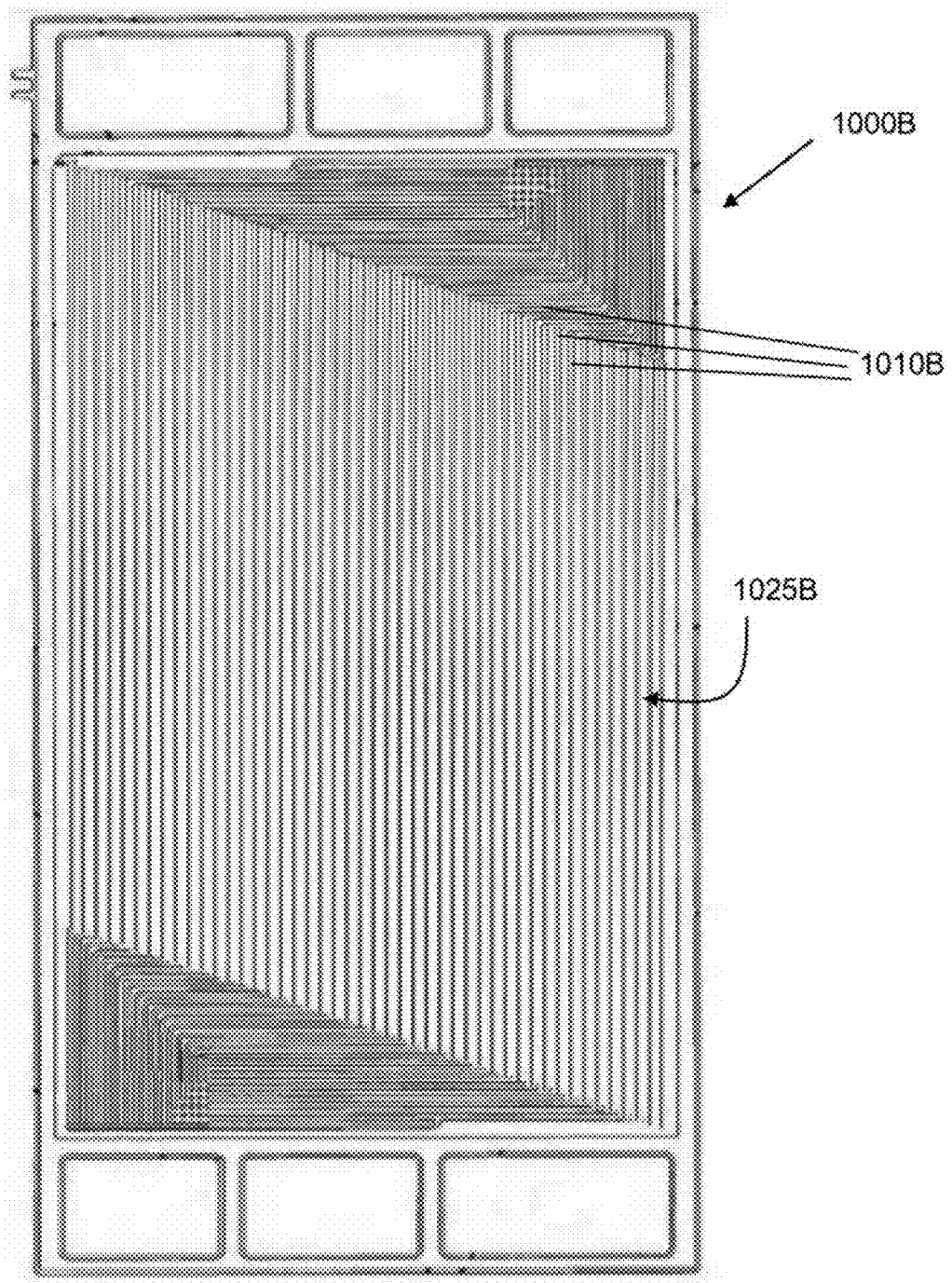
FIG. 10B shows a modification to the flow field plate of FIG. 10A, in which the width of each channel decreases exponentially along a middle portion of the length of each channel.

FIGS. 10A & 10B illustrate how an existing flow field design can be readily modified to incorporate e-flow along a portion of the length of the flow channels. FIG. 10A (prior art) shows a rectangular flow field plate 1000A comprising a fairly complex serpentine flow field with multiple serpentine channels 1010A extending between a supply and a discharge manifold opening. FIG. 10B shows a modification in which the width of each channel 1010B decreases exponentially along a middle portion 1025B of the length of each channel.

Figure 11:
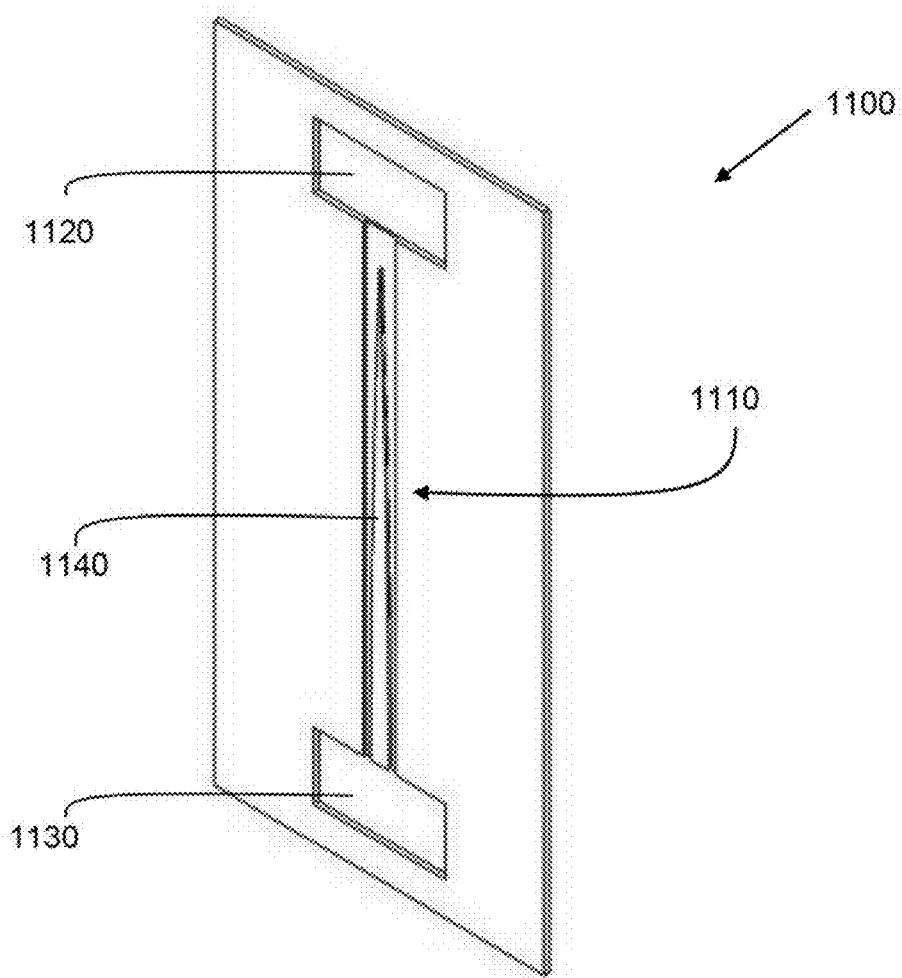
FIG. 11 is a simplified representation of a flow field plate comprising a substantially rectangular flow channel having a central rib with exponentially curved side walls.
Figure 12A:
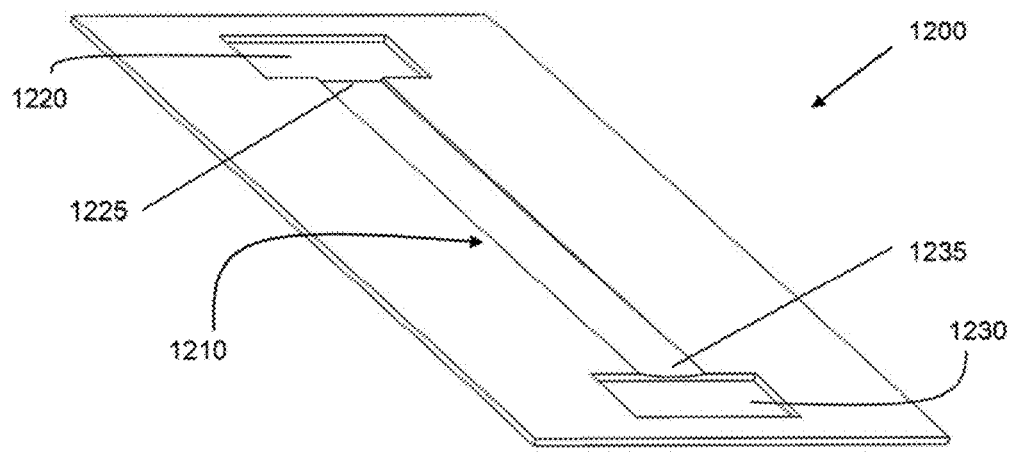
FIG. 12A shows, in a simplified representation, a flow field plate comprising a flow channel that has a conventional rectangular cross-section at one end and is gradually filleted to reduce its cross-section towards the other end, in the flow direction.
Figure 12B:
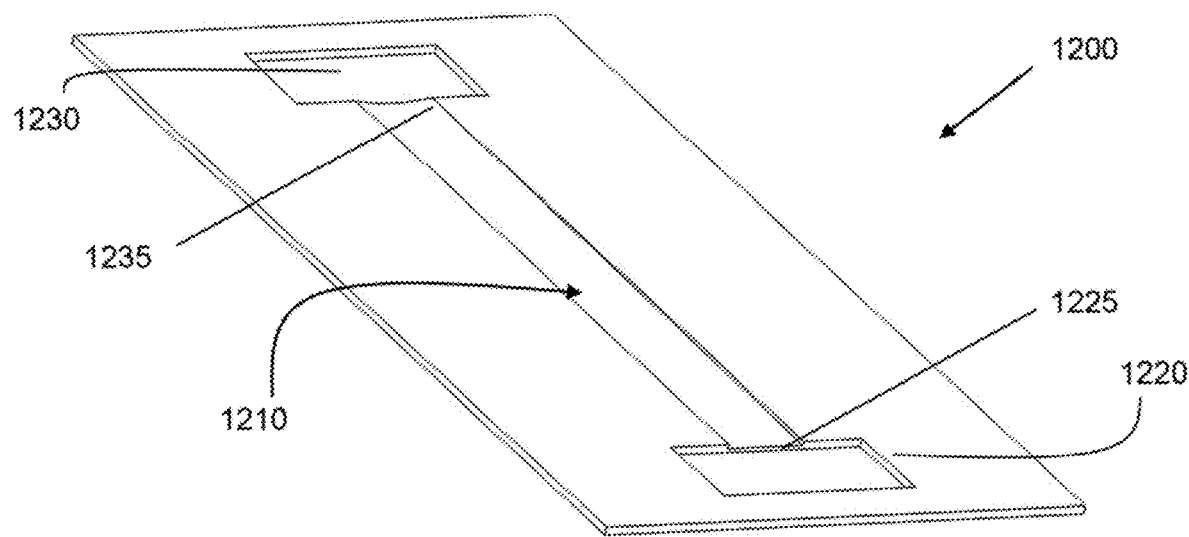
FIG. 12B shows another view of the flow field plate of FIG. 12A.

It is also possible to take a "conventional" flow channel (for example, a channel with a rectangular and constant cross-sectional shape and area along its length) and incorporate a shaped rib, fillet or other features within the volume of the original channel to reduce the channel cross-sectional area in a way that provides at least some of the benefits of e-flow. FIG. 11 shows an example of a reactant flow field plate 1100 with a single flow channel 1110 extending between a supply manifold opening 1120 and a discharge manifold opening 1130. The channel 1110 comprises a central rib 1140 with exponentially curved side walls. The rib splits the flow channel 1110 in two and effectively reduces its width gradually along most of its length in accordance with e-flow principles. FIGS. 12A and 12B show two different views of another example of a flow field plate 1200 with a single flow channel 1210 extending between a supply manifold opening 1220 and a discharge manifold opening 1230. The channel 1210 is of a conventional rectangular cross-section at one end 1225, and is gradually filleted to reduce its cross-section towards the other end 1235, in accordance with e-flow principles.

Figure 13:
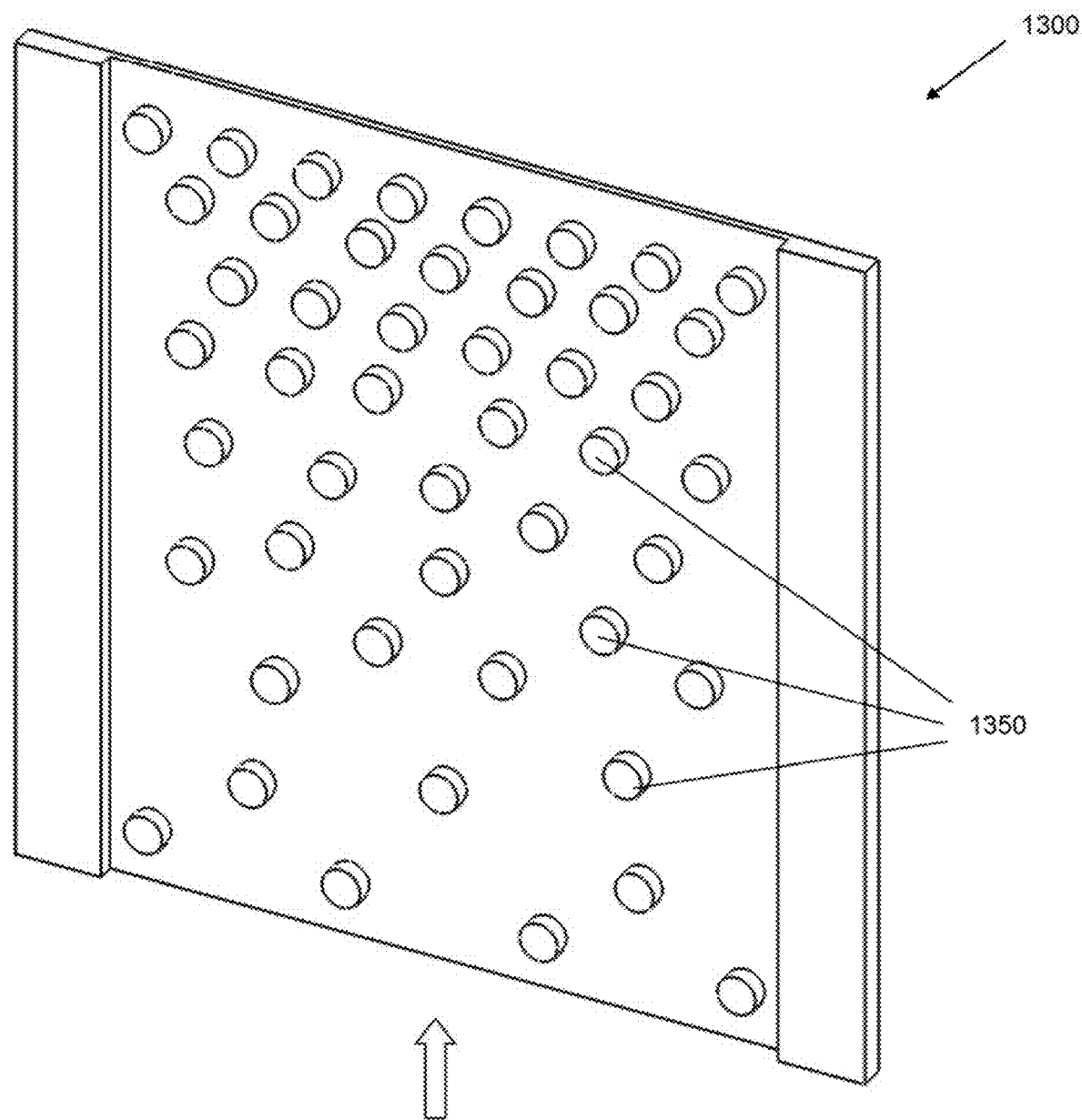
FIG. 13 is a simplified representation of a flow field plate comprising a rectangular flow channel incorporating rib dots, where density of the rib dots increases in the flow direction.
Figure 14:
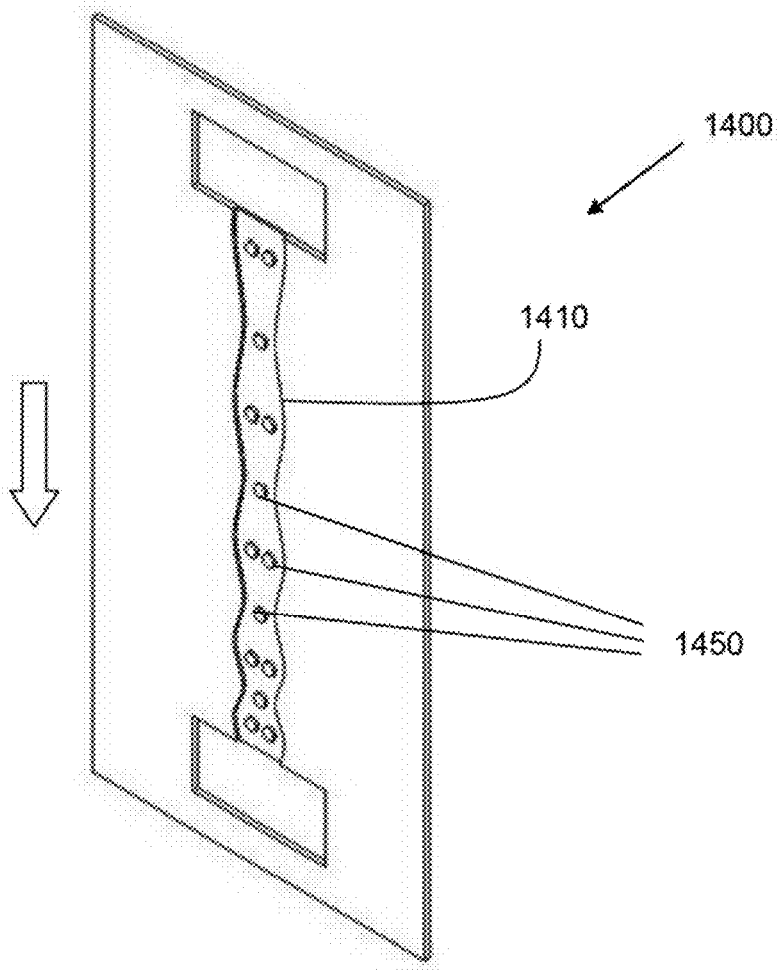
FIG. 14 is a simplified representation of a flow field plate comprising a wavy flow channel incorporating rib dots, where density of the rib dots increases in the flow direction.

In the examples described above, the flow channel dimensions vary along at least a portion of the channel length in a smooth and continuous fashion in accordance with e-flow principles. However, performance benefits can also be obtained by using reactant flow channels that incorporate a "discrete approximation" of e-flow. In other words, the characteristics of the channel can be varied as a function of distance along the channel in a stepwise or discontinuous fashion, but where the overall variation trends the smooth e-flow profile, either in fluctuations about the calculated profile, or in discrete approximations of the e-flow profile (so that it is in accordance with e-flow at a "macro" level). This approach can be used to achieve at least some of the performance benefits of e-flow, and can provide some options for improved flow fields that are easier to fabricate or to incorporate into existing fuel cell plate geometries. In all cases the outlet, or region near the outlet is smaller or more constricted that the inlet or inlet region. In some embodiments, the channels can contain discrete features that obstruct reactant flow, where the density and/or size of those features increases in the flow direction. An example of a flow field plate 1300 where the flow channels incorporate rib dots or raised columns 1350 is shown in FIG. 13. The density of the rib dots 1350 can increase in the reactant flow direction (indicated by the arrow) in accordance with the e-flow equations. Such features can be as high as the channel is deep (so that they touch the adjacent electrode) or can obstruct only part of the channel depth. In the example illustrated in FIG. 13, the "channel" is the entire active area and the rib dots (or other such features that obstruct reactant flow) are distributed across the active area in a varied density array approximating e-flow. In other examples, the rib dots or other features can be incorporated into one or more separate channels. FIG. 14 is a simplified representation of an anode flow field plate 1400 comprising a wavy flow channel 1410 incorporating rib dots 1450, where the density of the rib dots increases in the flow direction (indicated by the arrow).

In other examples, the flow channel dimensions (for example, width or depth) can decrease in the flow direction in a stepwise fashion. The increments by which the dimensions change and the distance between the step-changes are selected so that the changes in channel dimensions in the flow direction are consistent with the e-flow equations. In some embodiments the increments by which the channel dimensions change can be the same along the channel length, and in other embodiments it can vary along the channel length. Similarly, in some embodiments the distance between (or frequency of) the step-changes in channel dimensions can be the same along the channel length, and in other embodiments it can vary along the channel length.

Figure 15:
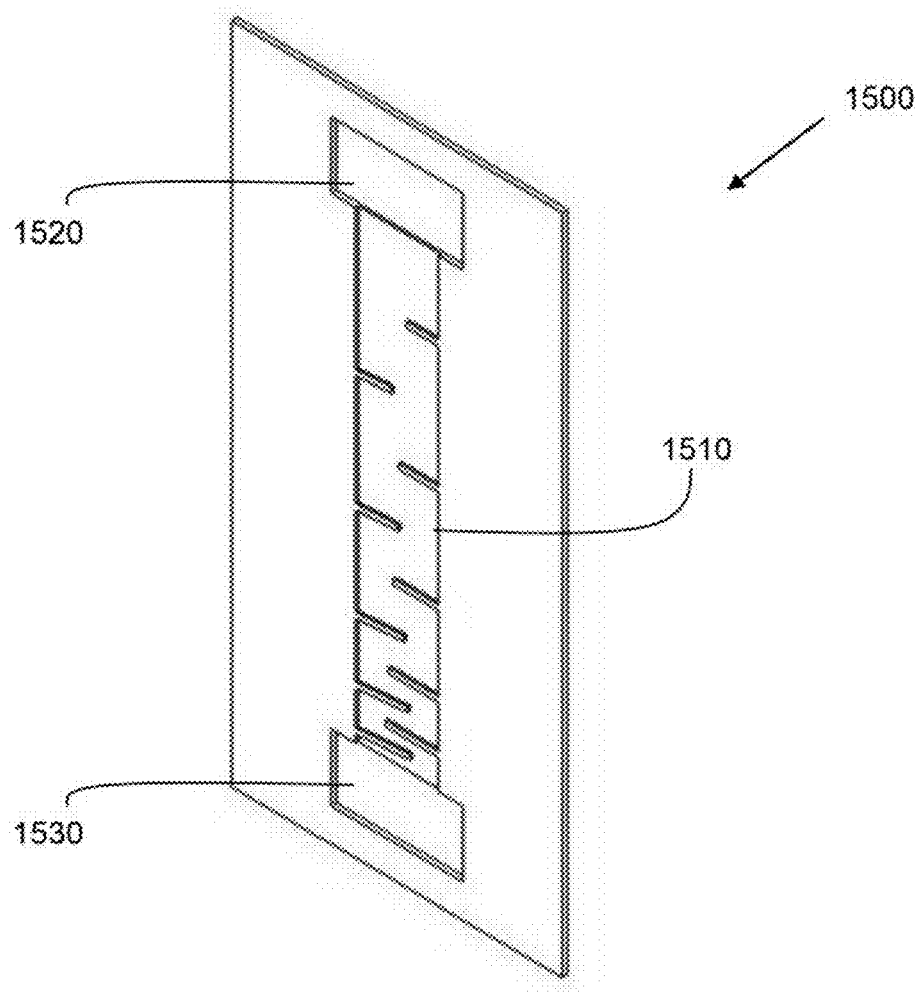
FIG. 15 is a simplified representation illustrating an example where the flow channel width decreases in a stepwise, non-linear fashion in the flow direction.
Figure 16:
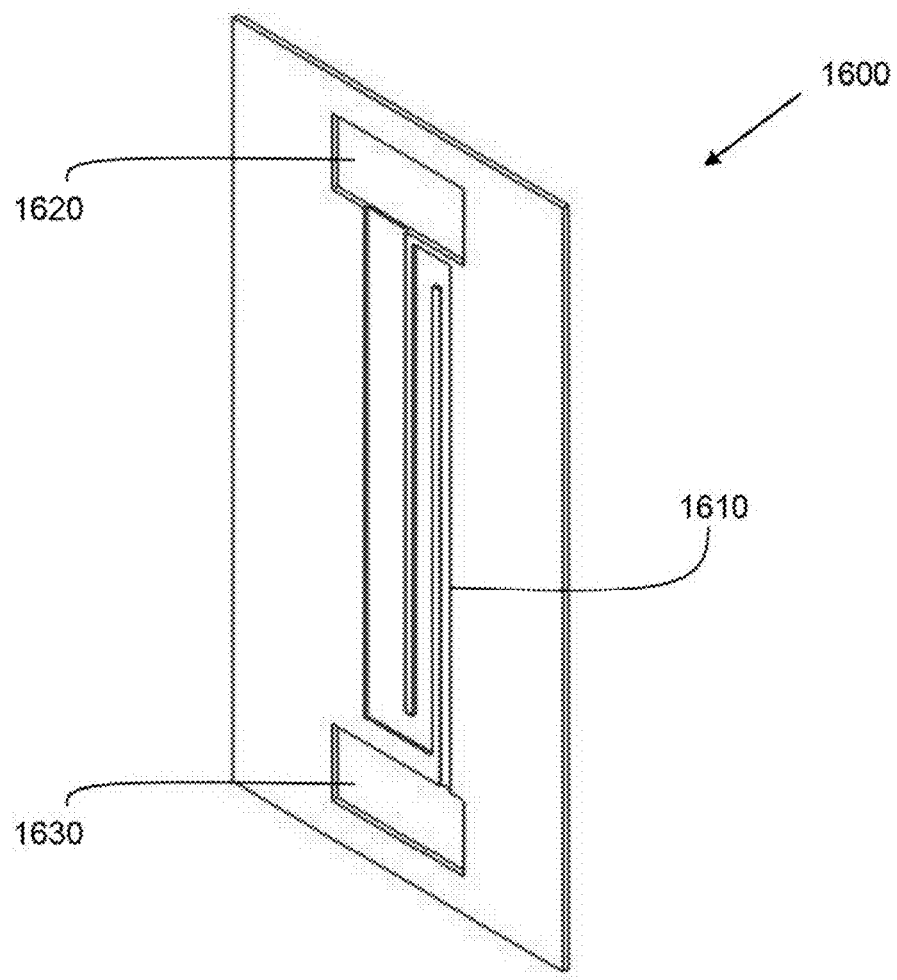
FIG. 16 is a simplified representation illustrating another example where the flow channel width decreases in a stepwise, non-linear fashion in the flow direction.

FIGS. 15 and 16 illustrate examples where the channel width decreases in a stepwise, non-linear fashion in the flow direction in accordance with the e-flow equations. FIG. 15 is a simplified representation illustrating an example flow field plate 1500 where the width of flow channel 1510 decreases in a stepwise, non-linear fashion in the flow direction between a supply manifold opening 1520 and a discharge manifold opening 1530. FIG. 16 is a simplified representation illustrating another example flow field plate 1600 where the width of flow channel 1610 decreases in a stepwise, non-linear fashion in the flow direction between a supply manifold opening 1620 and a discharge manifold opening 1630.

Figure 17:
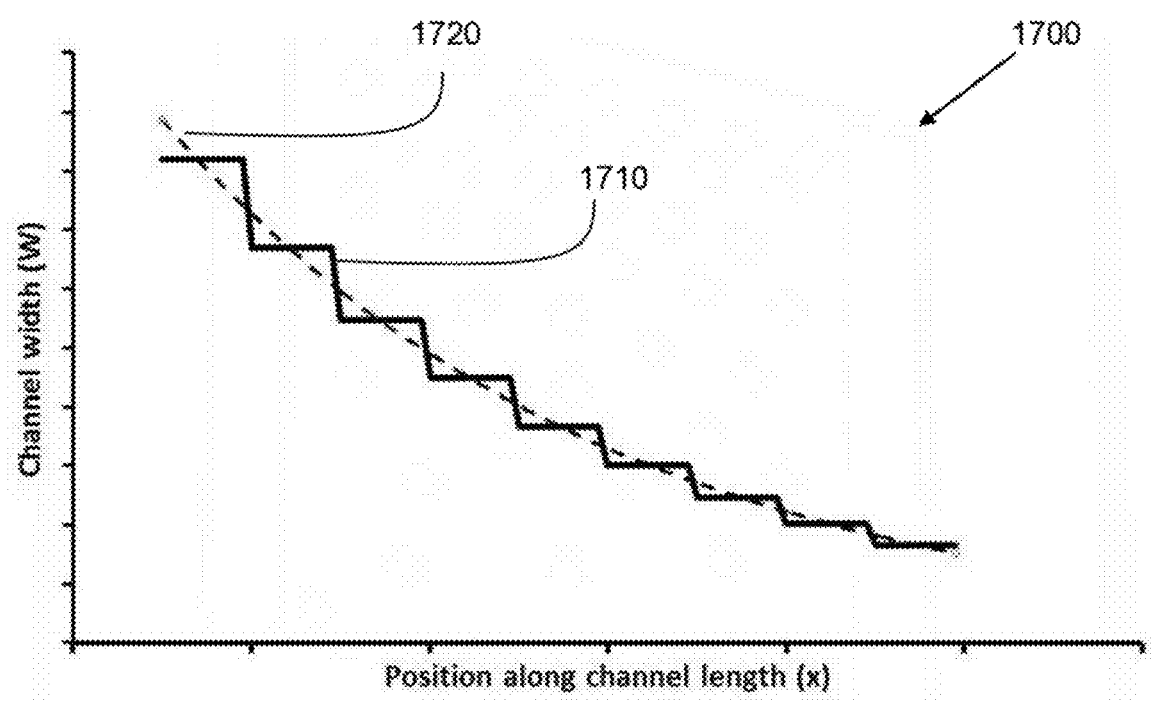
FIG. 17 is a graphical representation illustrating how stepwise or discrete changes in channel width can be used to approximate e-flow.

FIG. 17 is a graphical representation 1700 illustrating how stepwise or discrete changes in channel width can be used to approximate e-flow. The solid line 1710 represents changes in channel width and the dashed line 1720 shows a smooth exponential variation in channel width.

In other examples the porosity of the flow channel could vary in a continuous or stepwise fashion in accordance with e-flow principles.

FIGS. 1A, 1B, 3, 4A, 4B, 6A, 6B, 7A, 7B, 8, 9, 11, 12A, 12B, 13, 14, 15 and 16 are simplified drawings, in which the size of the flow channel and the manifold openings, and e-flow based variations in channel characteristics are exaggerated for the purposes of clear illustration.

In all of the above-described embodiments, the flow characteristics of the flow channel vary along at least a portion of the channel length substantially in accordance with the e-flow equations. The variations can be continuous or discrete. In the latter case, a continuous curve fitted to the discrete changes would be substantially consistent with the e-flow equations.

Flow channels with characteristics as described herein can be used at the anode or the cathode or both. Also they can be used for some or all of the fuel cells in a particular fuel cell stack.

The open channel area versus the rib or landing area on a reactant flow field plate is generally selected to give sufficient electrical contact between the plates and the adjacent MEAs for efficient current collection, while providing sufficient reactant access to the electrodes of the MEA to support the electrochemical reactions. Using a wider rib area (between flow channels) improves electrical connectivity and current collection in the fuel cell.

As used herein the "inlet" refers to either the start of the flow channel where reactant enters the channel, or the start of a region where the channel characteristics vary as a function of channel length as described herein; and "outlet" refers to either the downstream end of the channel, or the end of a region over which channel characteristics vary as a function of channel length as described herein.

Fuel cell flow field plates can utilize the reactant flow channels or flow field designs described above. Such plates can be made from suitable materials or combination of materials, and can be fabricated by suitable methods.

Other fuel cell components can also incorporate the flow channels or passageways as described herein. For example, such channels could be incorporated into the gas diffusion layer, or other components of the unit cell.

Fuel cells and fuel cell stacks can also incorporate the flow field plates and/or other components. The reactant flow channels and flow field designs described herein have been found to be particularly advantageous in PEM fuel cells, however they can be applied in other types of fuel cells or other electrochemical devices, such as electrolyzers.

Where a component is referred to above, unless otherwise indicated, reference to that component should be interpreted as including the equivalents of that component and any component which performs the function of the described component (namely, that is functionally equivalent), including components which are not structurally equivalent to the disclosed structure but which perform the function in the illustrated exemplary embodiments.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A method of operating a fuel cell on substantially pure hydrogen and air to produce electric power, the method comprising:
   (a) connecting said fuel cell to an electrical load, wherein said fuel cell comprises a membrane electrode assembly interposed between a first separator plate and a second separator plate, said membrane electrode assembly comprising an anode, a cathode, and a proton exchange membrane interposed between said anode and said cathode;
   (b) supplying substantially pure hydrogen to said anode via an anode flow channel formed in a major surface of said first separator plate, wherein said anode flow channel has an anode flow channel profile with a cross-sectional area that decreases continuously in the fuel flow direction;

(c) supplying air to said cathode via a cathode flow channel formed in a major surface of said second separator plate, (d) selecting, based at least in part on said anode flow channel profile, a fuel stoichiometry for said supplying said substantially pure hydrogen to said anode flow channel that causes said fuel cell to produce said electric power with a current density distribution across said fuel cell that approaches or achieves uniform current density distribution.

2. The method according to claim 1, wherein said anode flow channel has a width that decreases exponentially in the fuel flow direction.

3. The method according to claim 1, wherein said anode flow channel has a cross-sectional area that decreases continuously along its entire length.

4. The method according to claim 1, wherein said cathode flow channel has a cathode channel profile with a cross-sectional area that decreases continuously in the air flow direction, and air is supplied to said cathode flow channel at a stoichiometry selected in combination with said cathode channel profile, such that oxidant availability at progressively downstream lengthwise positions along said cathode flow channel approaches or achieves constant oxidant availability.

5. The method according to claim 1, wherein said anode flow channel has a width that decreases substantially continuously in the fuel flow direction.

6. The method according to claim 1, wherein said anode flow channel has a channel depth that is substantially constant and a channel width that decreases exponentially in the fuel flow direction.

7. The method according to claim 1, wherein said anode flow channel has a channel width at a selected lengthwise position along said anode flow channel that is proportional to a natural exponential function of said selected lengthwise position, said natural exponential function comprising a constant derived from said fuel stoichiometry.

8. The method according to claim 1, wherein said anode flow channel has a channel width that decreases continuously as a function of distance along its length, and wherein the relationship between said anode channel profile and said fuel stoichiometry is such that:

$$W(x) = W(0)e^{-\frac{x}{L}\ln\left(\frac{STOICH}{STOICH-1}\right)}$$

where W(x) is the channel width at lengthwise position x, x is a selected position along the channel length [m], W(0) is the channel width at the fuel inlet, L is the channel length, and STOICH is said fuel stoichiometry.

9. The method according to claim 1, said method comprising selecting, based at least in part on said anode flow channel profile, a fuel stoichiometry for supplying said substantially pure hydrogen to said anode flow channel that causes said fuel cell to produce said electric power with uniform current density distribution across said fuel cell.

* * * * *